(12) United States Patent
Cherian et al.

(10) Patent No.: US 12,160,908 B2
(45) Date of Patent: *Dec. 3, 2024

(54) PRIORITY ACCESS IN A WIRELESS LOCAL AREA NETWORK (WLAN)

(71) Applicant: QUALCOMM Incorporated, San Diego, CA (US)

(72) Inventors: George Cherian, San Diego, CA (US); Alfred Asterjadhi, San Diego, CA (US); Bin Tian, San Diego, CA (US); Stephen Jay Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,159

(22) Filed: Jan. 11, 2023

(65) Prior Publication Data
US 2023/0171818 A1    Jun. 1, 2023

Related U.S. Application Data

(63) Continuation of application No. 17/093,411, filed on Nov. 9, 2020, now Pat. No. 11,570,825.

(Continued)

(51) Int. Cl.
*H04W 74/08* (2024.01)
*H04W 4/90* (2018.01)
(Continued)

(52) U.S. Cl.
CPC ......... *H04W 74/0875* (2013.01); *H04W 4/90* (2018.02); *H04W 12/06* (2013.01); *H04W 48/06* (2013.01)

(58) Field of Classification Search
CPC ..................... H04W 74/0875; H04B 7/0452
(Continued)

(56) References Cited

U.S. PATENT DOCUMENTS 5,963,560 A    10/1999 Kalkunte
9,544,836 B2    1/2017 Park et al.
(Continued)

FOREIGN PATENT DOCUMENTS

CN    105165097 A    12/2015
WO    2017065976 A1    4/2017
(Continued)

OTHER PUBLICATIONS

Das S., (PL): "Priority Access Support in IEEE 802.11be: What and Why?", IEEE Draft, 11-19-1901-00-00BE-PRIORITY-ACCESS-SUPPORT-IN-IEEE-802-11BE-WHAT-AND-WHY, IEEE-SA Mentor, Piscataway, NJ, USA, vol. 802.11 EHT, 802.11be, Nov. 10, 2019 (Nov. 10, 2019), pp. 1-18, XP068164287, p. 2 p. 11-p. 14.
(Continued)

*Primary Examiner* — Kiet M Doan
(74) *Attorney, Agent, or Firm* — Holland & Hart LLP

(57) ABSTRACT

This disclosure provides systems, methods, and apparatus, including computer programs encoded on computer-readable media, for priority access on a shared wireless channel. A priority station (STA), an access point (AP), or a network operator may activate a priority access service. The priority access service provides priority access to authorize priority STAs by allowing them to use more aggressive contention parameters for contention-based access of the wireless channel as compared to other STAs. In some implementations, non-priority STAs may be configured with weakened contention parameters to increase or ensure the likelihood that a priority STA will win contention for access to the wireless channel.

20 Claims, 16 Drawing Sheets

Related U.S. Application Data

(60) Provisional application No. 62/933,959, filed on Nov. 11, 2019.

(51) Int. Cl.
*H04W 12/06* (2021.01)
*H04W 48/06* (2009.01)

(58) Field of Classification Search
USPC .......................................... 370/311, 338, 329
See application file for complete search history.

(56) References Cited

U.S. PATENT DOCUMENTS

| | | | |
|---|---|---|---|
| 11,057,171 | B2 | 7/2021 | Chu et al. |
| 2010/0150116 | A1* | 6/2010 | Ji .................... H04W 74/0875 370/338 |
| 2011/0151885 | A1 | 6/2011 | Buyukkoc et al. |
| 2013/0279427 | A1 | 10/2013 | Wentink et al. |
| 2015/0208444 | A1* | 7/2015 | Park .................. H04W 74/0833 370/329 |
| 2015/0237654 | A1 | 8/2015 | Park et al. |
| 2016/0316397 | A1 | 10/2016 | Pantelidou |
| 2017/0111854 | A1 | 4/2017 | Ho et al. |
| 2017/0230964 | A1 | 8/2017 | Park et al. |
| 2017/0273092 | A1 | 9/2017 | Nabetani et al. |
| 2018/0145844 | A1 | 5/2018 | Pera et al. |
| 2019/0261245 | A1 | 8/2019 | Shiotani et al. |
| 2021/0144778 | A1 | 5/2021 | Cherian et al. |
| 2023/0171817 | A1 | 6/2023 | Cherian et al. |

FOREIGN PATENT DOCUMENTS

| | | |
|---|---|---|
| WO | 2017223228 A1 | 12/2017 |
| WO | WO2021096838 A1 | 5/2021 |

OTHER PUBLICATIONS

International Search Report and Written Opinion—PCT/US2020/059801—ISA/EPO—Feb. 3, 2021.
Taiwan Search Report—TW109139233—TIPO—Jun. 28, 2024.

\* cited by examiner

PRIORITY ACCESS IN A WIRELESS LOCAL AREA NETWORK (WLAN)

CROSS-REFERENCE TO RELATED APPLICATIONS

The present Application for Patent is a Continuation of U.S. patent application Ser. No. 17/093,411 by CHERIAN et al., entitled "PRIORITY ACCESS IN A WIRELESS LOCAL AREA NETWORK (WLAN)", filed Nov. 9, 2020, which claims priority to U.S. Provisional Patent Application No. 62/933,959 by CHERIAN et al., entitled "PRIORITY ACCESS IN A WIRELESS LOCAL AREA NETWORK (WLAN)" filed Nov. 11, 2019, each of which are assigned to the assignee hereof and each of which are expressly incorporated by reference in its entirety herein.

TECHNICAL FIELD

This disclosure relates to the field of wireless communication, and more particularly to priority access in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs. A station (STA) may have a wireless connection (referred to as a wireless association, or just "association") when it has authenticated and established a wireless session with the AP. One or more STAs in the WLAN may utilize the shared wireless communication medium to communicate with the AP, and vice versa. The AP and STAs may use a contention-based access scheme to determine which WLAN device can use the shared wireless communication medium at a particular time. It is desirable for an AP to enable priority access for certain STAs to transmit or receive communications via the shared wireless communication medium.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by an access point (AP) of a wireless local area network (WLAN). The method may include managing a first basic service set (BSS) on a wireless channel. The method may include determining that at least a first station (STA) is configured to utilize a priority access service of the first BSS. The priority access service may be associated with prioritizing traffic to or from the first STA via the wireless channel. The method may include modifying one or more settings of the first BSS based on a determination that the first STA is configured to utilize the priority access service. The one or more settings may be modified to favor a contention-based access of the wireless channel by the first STA over one or more other STAs of the first BSS that are not configured to utilize the priority access service.

In some implementations, determining that the at least first STA is configured to utilize the priority access service includes receiving a priority service request frame from the first STA. In some implementations, the method may include transmitting a priority service response frame to the first STA to confirm that the first STA is authorized to use the priority access service.

In some implementations, determining that the at least first STA is configured to utilize the priority access service includes receiving, by the AP, a message from a network operator that includes a priority access enablement indicator. Alternatively, or additionally, determining that the at least first STA is configured to utilize the priority access service may include receiving, from a second STA associated with the first BSS, a priority access detection indicator that indicates that the second STA has detected a priority transmission from the first STA. Alternatively, or additionally, determining that the at least first STA is configured to utilize the priority access service may include detecting, by the AP, a transmission from the first STA that includes a priority access indication.

In some implementations, one or more bits of a preamble or a physical layer (PHY) header of the transmission from the first STA is populated with the priority access indication.

In some implementations, modifying the one or more settings of the first BSS includes signaling a priority service enablement indicator in a management frame to STAs in the first BSS.

In some implementations, modifying the one or more settings includes enabling a priority access class for the first STA based on a determination that the first STA is configured to utilize the priority access service. The priority access class may have a higher priority compared to other access classes used by the one or more other STAs.

In some implementations, the priority access class is associated with a first set of enhanced distributed channel access (EDCA) parameters that is different from other access classes for the one or more other STAs.

In some implementations, modifying the one or more settings includes causing the one or more other STAs to use a different access class for the contention-based access of the wireless channel.

In some implementations, modifying the one or more settings includes causing the one or more other STAs to use a reduced transmission opportunity (TXOP) duration when they win the contention-based access of the wireless channel.

In some implementations, modifying the one or more settings includes causing the one or more other STAs to adjust one or more EDCA parameters. The one or more EDCA parameters may include an arbitration inter-frame space number (AIFSN) setting, a minimum contention window size (CWmin) setting, a maximum contention window size (CWmax) setting, or any combination thereof.

In some implementations, causing the one or more other STAs to adjust the one or more EDCA parameters includes causing the one or more STAs to apply an offset value to the AIFSN setting, the CWmin setting, or the CWmax setting. Additionally, or alternatively, causing the one or more other STAs to adjust the one or mor EDCA parameters may include causing the one or more other STAs to adjust the AIFSN[AC], the CWmin[AC], the CWmax[AC], the TXOP Limit[AC], or any combination thereof, wherein the AC is the access category currently assigned to the traffic streams of the one or more other STAs.

In some implementations, the method may include, before modifying the one or more settings, determining whether the first STA is authorized to utilize the priority access service and modifying the one or more settings if the first STA is authorized to utilize the priority access service.

In some implementations, the AP is a national security and emergency preparedness (NSEP) AP configured to support the priority access service in the first BSS managed by the NSEP AP. The first STA may be an NSEP STA.

Another innovative aspect of the subject matter described in this disclosure can be implemented as a method performed by a first station (STA) configured to utilize a priority access service of a basic service set (BSS) of an access point (AP). The method may include transmitting a priority service request frame that includes a priority access indication to the AP via a wireless channel. The method may include receiving a priority service response frame that indicates the first STA is authorized to use the priority access service. The method may include performing a prioritized contention-based access of the wireless channel using a first set of enhanced distributed channel access (EDCA) parameters associated with the priority access service. The first set of EDCA parameters may favor the first STA over one or more other STAs that are not configured to utilize the priority access service.

In some implementations, the first set of EDCA parameters are associated with a priority access class that is different from other access classes for the one or more other STAs. The priority access class may have comparatively more aggressive EDCA parameters when compared to one or more of a voice access class (AC_VO), a video access class (AC_VI), a best effort access class (AC_BE), a background access class (AC_BK), or any combination thereof, used by the one or more other STAs.

In some implementations, the method includes receiving a beacon message from the AP, where the beacon message indicates that the AP supports the priority access service. The method may include transmitting the priority service request frame in response to a determination that the AP supports the priority access service.

In some implementations, the first STA is a national security and emergency preparedness (NSEP) STA configured to utilize the priority access service in a BSS managed by an NSEP AP. The AP may be an NSEP AP.

Another innovative aspect of the subject matter described in this disclosure can be implemented as an apparatus of an access point (AP). The apparatus may include at least one processor communicatively coupled with at least one modem. The processor may be configured to manage a first basic service set (BSS) on a wireless channel and determine that at least a first station (STA) is configured to utilize a priority access service of the first BSS. The priority access service may be associated with prioritizing traffic to or from the first STA via the wireless channel. The apparatus may include the at least one modem configured to modify one or more settings of the first BSS based on a determination that the first STA is configured to utilize the priority access service, where the one or more settings are modified to favor a contention-based access of the wireless channel by the first STA over one or more other STAs of the first BSS that are not configured to utilize the priority access service.

In some implementations, the at least one processor is configured to process a priority service request frame received from the first STA via the at least one modem. The at least one processor may be configured to output a priority service response frame for transmission via the at least one modem to the first STA to confirm that the first STA is authorized to use the priority access service.

In some implementations, the at least one processor is configured to process a message received from a network operator via the at least one modem, the message including a priority access enablement indicator.

In some implementations, the at least one modem configured to signal a priority service enablement indicator in a management frame to STAs in the first BSS in response to a determination that the first STA is configured to utilize the priority access service.

In some implementations, the at least one processor is configured to enable a priority access class for the first STA based on the determination that the first STA is configured to utilize the priority access service, the priority access class having a higher priority compared to other access classes used by the one or more other STAs.

In some implementations, the priority access class is associated with a first set of enhanced distributed channel access (EDCA) parameters that is different from other access classes for the one or more other STAs.

In some implementations, the at least one processor is configured to output one or more messages to cause the one or more other STAs to use a different access class for the contention-based access of the wireless channel.

In some implementations, the at least one processor is configured to determine whether the first STA is authorized to utilize the priority access service and cause the at least one modem to modify the one or more settings if the first STA is authorized to utilize the priority access service.

In some implementations, the AP is a national security and emergency preparedness (NSEP) AP configured to support the priority access service in a BSS managed by the NSEP AP and the first STA is an NSEP STA.

In some implementations, the apparatus includes at least one transceiver coupled to the at least one modem, a plurality of antennas coupled to the at least one transceiver to wirelessly transmit signals output from the at least one transceiver and a housing that encompasses the at least one modem, the at least one processor, the at least one transceiver and at least a portion of the plurality of antennas.

Another innovative aspect of the subject matter described in this disclosure can be implemented as an apparatus of a first station (STA) configured to utilize a priority access service of a basic service set (BSS) of an access point (AP). The apparatus may include at least one modem configured to output a priority service request frame that includes a priority access indication for transmission via a wireless channel to the AP. The at least one modem may be configured to obtain a priority service response frame that indicates the first STA is authorized to use the priority access service. The apparatus may include at least one processor communicatively coupled with the at least one modem and configured to perform a prioritized contention-based access of the wireless channel via the at least one modem using a first set of enhanced distributed channel access (EDCA) parameters associated with the priority access service, where the first set of EDCA parameters favors the first STA over one or more other STAs that are not configured to utilize the priority access service.

In some implementations, the at least one modem is configured to receive a beacon message from the AP, where the beacon message indicates that the AP supports the priority access service. The at least one modem may be configured to output the priority service request frame in response to a determination that the AP supports the priority access service.

In some implementations, the apparatus includes at least one transceiver coupled to the at least one modem, a plurality of antennas coupled to the at least one transceiver to wirelessly transmit signals output from the at least one transceiver and a housing that encompasses the at least one modem, the at least one processor, the at least one transceiver and at least a portion of the plurality of antennas.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
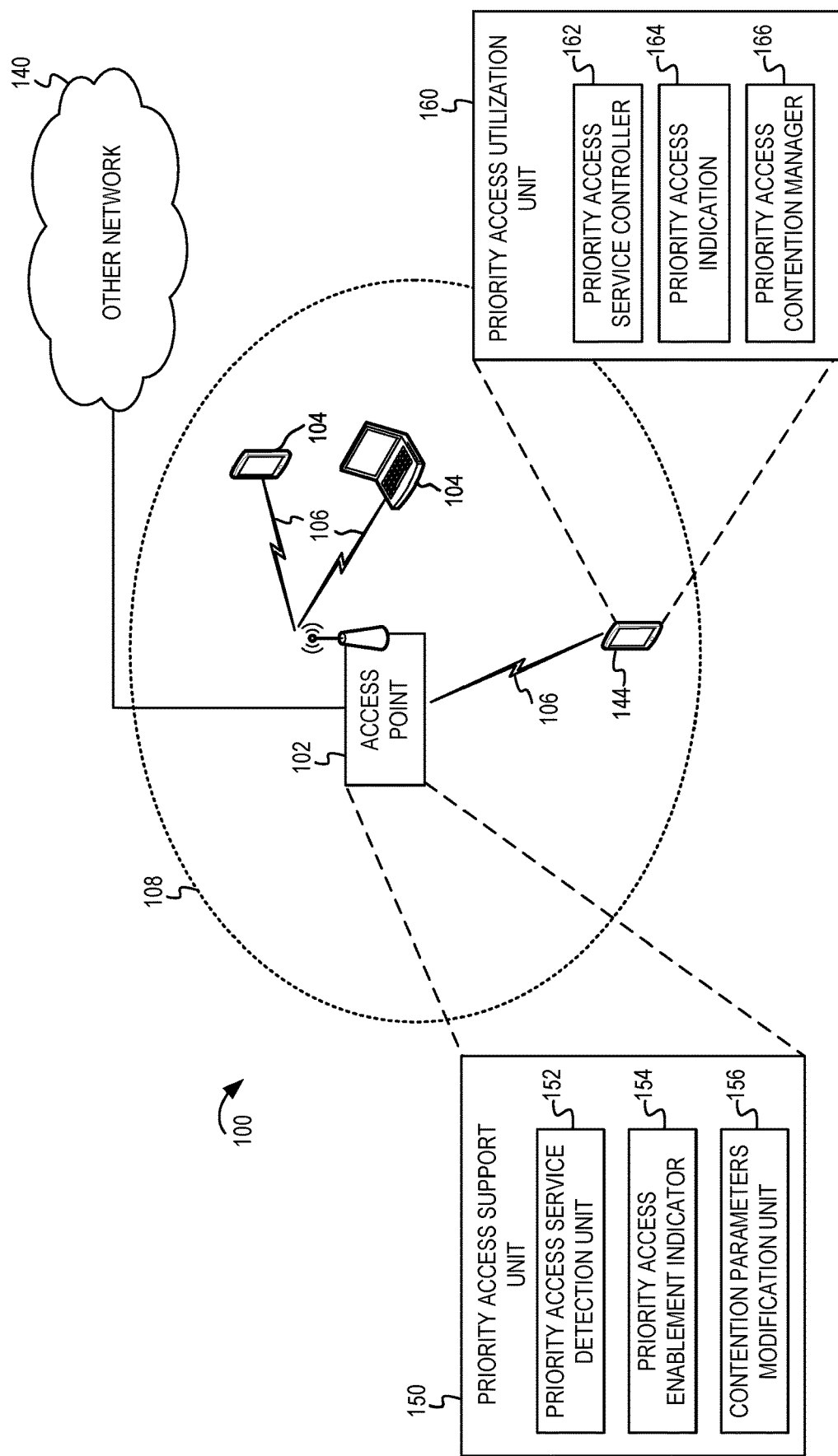
FIG. 1 shows a pictorial diagram of an example wireless communication network that supports priority access according to some implementations.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A wireless local area network (WLAN, sometimes also referred to as a Wi-Fi™ network) in a home, apartment, business, or other area may include one or more WLAN devices. An access point (AP) is a WLAN device that includes a distribution system access function. An AP may provide a wireless coverage area for devices to access the WLAN via a wireless channel. The AP may provide distribution system access for one or more stations (STAs, sometimes also referred to as non-AP STAs) that are associated with the AP. The basic building block of a WLAN is a Basic Service Set (BSS), which is managed by an AP and includes one or more STAs associated with the AP. STAs can establish a wireless association (also referred to as a wireless link wireless connection, among other examples) with an AP via the wireless channel to join the BSS. Once the STA has a wireless association with the AP, the STA may communicate with other devices of the WLAN or of another network via the distribution system access function of the AP.

A contention-based access scheme may be used to determine which WLAN device (such as an AP or a STA) can use the wireless channel at a particular time. The contention-based access scheme may influence the distribution of resources available in the shared wireless channel. Using contention-based access, each WLAN device may contend for access to the wireless channel. To prevent collisions, each WLAN device may observe the wireless channel before attempting to transmit. If the wireless channel is busy (by another device), the device may wait for a random backoff time period before checking the wireless channel again. If the wireless channel is free, the WLAN device may contend for access the network. Multiple WLAN devices may contend at the same time. Enhanced Distributed Channel Access (EDCA) is an example of a contention-based access protocol. The examples of contention-based access techniques in this disclosure are based on EDCA. However, other types of contention-based access and contention parameters may be used. Using EDCA, a set of parameters (referred to as EDCA parameters) may be associated with a particular access class (AC) and level of priority. Different access categories (having different levels of priority) may have different contention parameters that impact the likelihood that a STA will win contention for the wireless channel. Examples of contention parameters include contention window boundaries (CWmin, CWmax), arbitration interframe space number (AIFSN), and a backoff algorithm. In addition to defining rules for the contention, EDCA permits a winner of a contention to use the wireless channel for a period of time called a transmission opportunity (TXOP). Several factors may impact which device wins the contention. Depending on the quantity of devices contending for access and the TXOP duration, some devices may be prevented from transmitting or receiving important wireless communications. It is desirable to provide some WLAN devices with higher priority access to the shared wireless channel. For example, national security and emergency preparedness (NSEP) personnel may benefit from having a higher priority or lower latency when using a shared wireless channel. Examples of NSEP personnel may include first responders and law enforcement officers.

This disclosure provides systems, methods, and apparatus, including computer programs encoded on computer-readable media, enabling priority access by a particular STA in a wireless local area network. Various implementations relate generally to managing contention-based access settings to enable priority access for one or more STAs (which may be referred to as a priority STA or NSEP STA, among other examples). In some implementations, the priority STA may use different EDCA parameters (such as more aggressive contention window times, shorter interframe space, and longer TXOP compared to other STAs) to ensure or improve the likelihood of the priority STA winning a contention for the wireless channel. Other STAs that do not support the priority access service or are not authorized to use the priority access service may be referred to as non-priority STAs. In some implementations, the non-priority STAs may use less aggressive EDCA parameters (compared to the priority STA) to provide more opportunity for the priority STA to win contention for the wireless channel.

Priority Access provides priority to system resource access for authorized users to enhance their probability of successful communication during periods of network congestion. Priority access involves preferential treatment in obtaining channel access and in allocation of network resources. The priority access service (also referred to as priority access mode) is only available to designated, authorized individuals or devices. When an authorized user or a managed service provider determines a need for priority, it may invoke the priority access service in an on-demand fashion in accordance with the examples described herein.

In some implementations, a priority STA may invoke a priority access service by sending a request to the AP. For example, the priority STA may transmit a frame that includes a priority access indication. The priority access indication may be included in a transmission, such as a physical layer convergence protocol (PLCP) protocol data unit (PPDU). In some implementations, the priority access indication may be included in a preamble or a physical layer (PHY) header of the PPDU. In some implementations, the priority STA also may signal a priority service duration. The priority service duration may inform other devices of an amount of time the priority STA intends to use the priority access service. The priority service indication or the priority service duration (or both) may be signaled as one or more bits of the preamble or PHY header of the PPDU. In some implementations, when a priority STA activates a priority access service in a BSS, other priority STAs associated with the BSS may use the priority access service.

In some implementations, a priority STA may transmit a priority service request frame indicating a request to utilize a priority access service. The AP may be configured to verify that the priority STA is authorized to use the priority access service and respond with a priority access response frame. If the priority STA is authorized to use the priority access service, the AP and the priority STA may manage transmission of traffic to and from the priority STA in accordance with the priority access service. In some implementations, managing transmission of the traffic to and from the priority STA can include using preferential treatment. Alternatively, or additionally, an AP may detect a need for priority access by a priority STA. Thus, in some implementations, the AP invoke the priority access service by sending a priority service request frame to the priority STA.

In some implementations, an AP may adjust or select the contention parameters to support the priority access by the priority STA. Referring to the example using EDCA for contention-based access, EDCA currently defines four access classes (ACs) based on type of traffic. ACs may refer to an "access class" or an "access category" interchangeably. In some implementations, each traffic stream from a STA may be associated with a particular AC and may use a set of EDCA parameters related to that AC. The ACs may include background, best effort, voice, and video access classes. For example, a background access category (AC_BK) may have a lower quality of service compared to a best effort access category (AC_BE). A voice access category (AC_VO) may have a higher quality of service than the AC_BE. A video access category (AC_VI) may have a higher quality of service than the AC_VO. In some implementations, the priority access service may be associated with the AC_VO access class while prioritizing the traffic to or from the priority STA above traffic for non-priority STAs using the AC_VO access class. In some implementations, the AP may redefine the access categories or adjust the contention parameters for a priority STA. Additionally or alternatively, the AP may adjust the contention parameters of non-priority STAs to enable a priority STA to have a higher priority. As an example, the AP may provide more aggressive EDCA contention parameters to a priority STA or provide less aggressive EDCA contention parameters to non-priority STAs. The final outcome of the adjustment of the EDCA contention parameters (for either or both of the priority STA or the non-priority STAs) is that a priority STA has higher priority when contending for the medium to transmit priority traffic.

In some implementations, one or more new access categories may be defined to have a greater level of priority than existing access categories. In some implementations, the priority access service is defined by a priority access class (AC_PRI) that has a higher quality of service compared to existing access classes defined for EDCA (including the AC_BK, AC_BE, AC_VO, and AC_VI). Because the AC_PRI may not be recognized by legacy STAs that only recognize the existing four access classes, it is possible that the legacy STAs may not recognize the AC_PRI and may fail to defer to the priority STA. Therefore, in some implementations, an AP may modify one or more settings (such as the EDCA parameters) for the existing access classes to weaken contention-based access for STAs using the existing access classes.

In some implementations, an AP may adjust the EDCA parameters for non-priority STAs so that the non-priority STAs get a lower priority compared to the priority STA. For example, the AP can adjust the EDCA parameters (also referred to as an EDCA set) for existing access classes to be less aggressive. In some implementations, the AP may create a new EDCA set for the priority STA based on existing EDCA parameters for an access class while the existing EDCA parameters for that access class are downgraded. Whichever EDCA parameters for various access classes are modified, the result is that priority STAs have a higher priority compared to non-priority STAs.

In some implementations, non-priority STAs may modify their respective EDCA parameters or TXOP duration limits to back off utilization of the wireless channel so that the priority STAs will have more likelihood of winning contention. For example, the non-priority STAs may adjust their contention parameters to weaken contention-based access for the existing access classes. In some implementations, non-priority STAs may modify a backoff algorithm or contention window boundaries so that the priority STA can have a higher likelihood of winning contention. For example, the non-priority STA may disable a minimum contention window size (CWmin) or upper limit for a random backoff counter. Thus, the non-priority STA may be less aggressive in retrying a contention. In some implementations, the random backoff counter may be selected from a range from zero to one less than a maximum contention window size (CWmax). The priority STA will continue to use the CWmin which will give the priority STA a smaller range for selecting an initial random backoff counter. In some implementations, the non-priority STAs may add an offset value to the contention window boundaries (CWmin, CWmax) or arbitration interframe space number (AIFSN). Alternatively, or additionally, the non-priority STAs may decrease a TXOP duration limit by an offset value. In some implementations, the AP may signal an offset value or other setting to modify the CWmin, the CWmax, the AIFSN, or the TXOP duration. Alternatively, or additionally, the offset value or other setting may be specified in a standard technical specification.

In some implementations, a first AP that manages a first BSS may support priority access for a priority STA even if the priority STA is not associated with the first BSS. As more WLANs are deployed in an environment, the wireless medium may be shared by many BSSs. For example, a first AP may manage a first BSS via the same wireless channel utilized by a second AP managing a second BSS. BSSs that share a wireless channel in the same location may be referred to as neighboring BSSs or overlapping BSSs (OBSSs). In some implementations, the priority STA may be associated with an OBSS (such as a second BSS) that uses a same wireless channel as the first BSS. The first AP may determine that the priority STA is utilizing the priority access service. For example, the first AP may detect a transmission from the priority STA in the OBSS. The first AP may observe a preamble or PHY header of the transmission for a priority access indication. If the first AP detects a priority access indication for any device (either in its BSS or in an OBSS), the first AP may signal a priority service enablement indicator to the first BSS. The priority service enablement indicator may cause STAs in the first BSS to weaken their contention parameters or otherwise give preferential treatment for the priority STA to access the wireless channel.

In some implementations a first AP may inform a second AP when the priority service is activated. In general, a first AP has control of the EDCA parameters of the STAs (priority STAs or non-priority STAs) that are associated to it. It may be desirable to adjust EDCA parameters for non-priority STAs that are associated to the second AP so that a priority STA associated with the first AP can have a higher priority over non-priority STAs in an OBSS managed by the second BSS. Thus, in some implementations, the first AP may request or instruct a second AP in the vicinity (or any other APs managing an OBSS) to cause non-priority STAs to update the EDCA contention parameters in their respective BSSs. For example, the first AP may send a message (via a wireless or wired communication media or via a service provider network) to a second AP to inform the second AP that the priority service has been activated by a priority STA in a first BSS managed by the first AP. The second AP may be expected to adjust the EDCA contention parameters for STAs in a second BSS managed by the second AP to support the priority service for the priority STA in the first BSS.

In some implementations, a non-priority STA may assist with an AP determining that a priority-STA is utilizing a priority access service. For example, a non-priority STA may detect a transmission from the priority STA that includes a priority access indication. The non-priority STA may signal a priority detection indicator to its respective AP to cause its AP to support the priority access. When the AP receives the priority detection indicator, the AP may signal a priority service enablement indicator to its BSS. Furthermore, in some implementations, the AP may signal changes to contention parameters for existing access classes. Thus, legacy STAs in the BSS may weaken their contention parameters even if they do not recognize the priority access service and even if the priority STA is in an OBSS.

In some implementations, an AP may advertise the access modes (including the priority access mode) and access classes that the AP supports. For example, the AP may include an indication, in a beacon message or probe response message, that the AP supports the priority access service. A priority STA may select an AP that supports the priority access service. In some implementations, when a priority STA or the AP activates the priority access service, the priority access service may be used for all traffic between the AP and the priority STA. Alternatively, the AP or the priority STA may use the priority access service for particular frames (such as those that include emergency communications).

This disclosure includes various techniques for an AP to set different contention parameters for different access classes used by STAs in its BSS. For example, the AP may include an EDCA Parameter Set element in a management frame (such as a Beacon, Probe Response, or Association Response, among other examples). In some implementations, the AP may indicate to a particular STA to use another access class so that a priority STA can have a higher quality of service. The AP may signal the change in a frame to a particular STA or to all STAs using the legacy access classes. Furthermore, in some implementations, an AP may transmit a beacon frame or other management frame that includes a priority service activation notification so that any STAs or other APs in the vicinity of the priority STA may become aware that the priority service has been activated. Any non-priority STAs or other APs may adjust the EDCA contention parameters to enable the priority STA to gain a higher priority access to the wireless channel.

In some implementations, the AP or the priority STA also may indicate to the non-priority STAs the duration of time (priority service event duration) for which the priority access service is valid. Thus, the AP or the priority STA can selectively turn on and turn off the priority access service either by enabling a priority access service for traffic to and from the priority STA, by the use of the priority access indication in particular transmissions, by enabling the priority access service for an indicated priority service event duration.

In some implementations, an AP may determine that a STA is abusing the priority access service to transmit non-priority traffic. For example, a non-priority STA may attempt to use the priority access service without authorization. The AP may authorize the priority access service based on a network configuration, manufacturer configuration, or device setting. However, if a STA does not have authorization to use the priority access service, the AP may take countermeasures against the STA. For example, the AP may disassociate the STA or may modify one or more settings for the other STAs to redistribute the contention likelihood for the other STAs.

In some implementations, an AP that supports a priority access service may advertise this capability in Beacon and Probe Response frames. A priority STA may query the AP to gain additional details prior to association. During association, the AP may verify the authority of a requesting STA to use the priority access service. This may be accomplished using a subscription service provider's authorization infrastructure via a subscription service provider network (SSPN) interface. In some implementations, the AP may store the results of this authorization process locally to enable subsequent verification. An AP also may use this information to confirm authority during an association or a reassociation request from a priority STA. For example, the AP may confirm the authority of the priority STA to use the priority access service (such as using the locally stored verification information or reaching out to an NSEP Service Provider via the SSPN interface).

Particular implementations of the subject matter described in this disclosure can be implemented to realize one or more of the following potential advantages. A priority STA can share the priority access service while non-priority STAs may use a lower quality of service (QOS) relative to the priority STA. NSEP personnel can obtain priority access service to enhance their probability of successful communication during periods of network congestion. By modifying the EDCA parameters for the priority STA or non-priority STAs, an AP may provide the priority access service to the priority STA even though non-priority STAs may be legacy devices. Advantageously, some implementations of this disclosure enable priority access for a priority STA regardless of whether the priority STA is associated with an OBSS.

FIG. 1 shows a pictorial diagram of an example wireless communication network 100 that supports priority access according to some implementations. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may provide access to another network 140. For example, the AP 102 may be connected to a gateway device (not shown) which provides connectivity to the other network 140. The WLAN 100 may include numerous wireless communication devices such as at least one access point (AP) 102 and multiple stations (STAs) 104 that may have a wireless association with the AP 102. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 111. Additionally, two STAs 104 may communicate via a direct communication link 111 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 111 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHZ bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

FIG. 1 shows a priority STA 144 that is associated with the AP 102. For example, the priority STA 144 may have a wireless communication link 106 with the AP 102. The priority STA 144 may have priority traffic to send to the AP 102 or the AP 102 may have priority traffic to send to the priority STA 144. However, in a traditional contention-based access scheme, each of the devices (the AP 102, the priority STA 144, and the other STAs 104) may contend for access to the wireless channel. Absent the techniques in this disclosure, one of the other STAs 104 may be more likely to win contention, thereby preventing the priority STA 144 from having access to the wireless channel for a period of time. In accordance with this disclosure, the WLAN may support priority access for the priority STA 144 to enhance their probability of successful communication during periods of network congestion.

In some implementations, the priority STA 144 may invoke the priority access service by sending a request to the AP 102. The AP 102 may verify that the priority STA 144 is authorized to use the priority access service and respond with a priority access response message. The priority access service may include prioritizing traffic to or from the priority STA 144 over other STAs 104. For example, the AP 102 may give a higher priority for traffic to or from the priority STA 144 over the other STAs 104. In some implementations, when the priority STA 144 is authorized to use the priority access service, the priority STA 144 may use the AC_VO access class for its contention-based access of the wireless channel. The AP 102 may prioritize traffic to or from the priority STA 144 over traffic to or from other STAs 103 allocated for the AC_VO access class.

In some implementations, the AP 102 may manipulate one or more contention parameters to enable priority access service for the priority STA 144. For example, the priority access may be accomplished by modifying EDCA parameters for different access classes. EDCA defines four access classes based on type of traffic: AC_BK, AC_BE, AC_VO, and AC_VI. However, there currently is not an access class for priority access. In some implementations, a priority access class (AC_PRI) can be defined. Furthermore, because the AC_VI and AC_VO access classes already have aggressive contention parameters, the contention parameters for those classes can be temporarily weakened so that the priority STA 144 is more likely to win contention-based access of the wireless channel. Either the AP 102 or the other STAs 104 may detect a transmission from the priority STA 144 that enables a priority access service for the priority STA 144. The AP 102 and the other STAs 104 may weaken their respective contention parameters to support the priority access of the priority STA 144.

The AP 102 may include a priority access support unit 150 which supports the priority access by the priority STA 144. The priority access support unit 150 may include a priority access service detection unit 152. The priority access service detection unit 152 may detect a transmission from the priority STA 144 that includes a priority access indication. The priority access indication may be in a preamble or a PHY header of a PPDU transmitted by the priority STA 144. In some implementations, the priority access service detection unit 152 may be configured to receive a management message from a network operator that activates the priority access service. The priority access support unit 150 may be configured to send a priority access enablement indicator 154 so that the other STAs 104 also can support the priority access service of the priority STA 144. The priority access support unit 150 also may include a contention parameters modification unit 156 to modify contention parameters for the access classes of the other STAs 104. In some implementations, the contention parameters modification unit 156 may advertise different CWmin, CWmax, AIFSN, or TXOP durations for one or more legacy access classes so that a legacy STA will have less likelihood of winning contention (compared to the priority STA 144). Although described as being in the AP 102, the priority access support unit 150 also may be implemented in a non-priority STA (such as one of the other STAs 104).

The priority STA 144 may include a priority access utilization unit 160. The priority access utilization unit 160 may include a priority access service controller 162 configured to enable or disable a priority access service of the priority STA 144. In some implementations, the priority STA 144 may be configured to always use the priority access service. Alternatively, the priority access service may be activated by the priority access service controller 162 when needed, such as an emergency. The priority access utilization unit 160 may be configured to send a priority access indication 164. The priority access indication 164 may be included in a transmission of the priority STA 144 so that the AP 102 and the other STAs 104 can determine that the priority STA 144 is using the priority access service. The priority access utilization unit 160 may include a priority access contention manager 166 configured to manage contention-based access by the priority STA 144. The priority access contention manager 166 may implement aggressive EDCA parameters (compared to the other STAs 104) to ensure or improve likelihood that the priority access utilization unit 160 will win contention-based access of the wireless channel.

Figure 3:
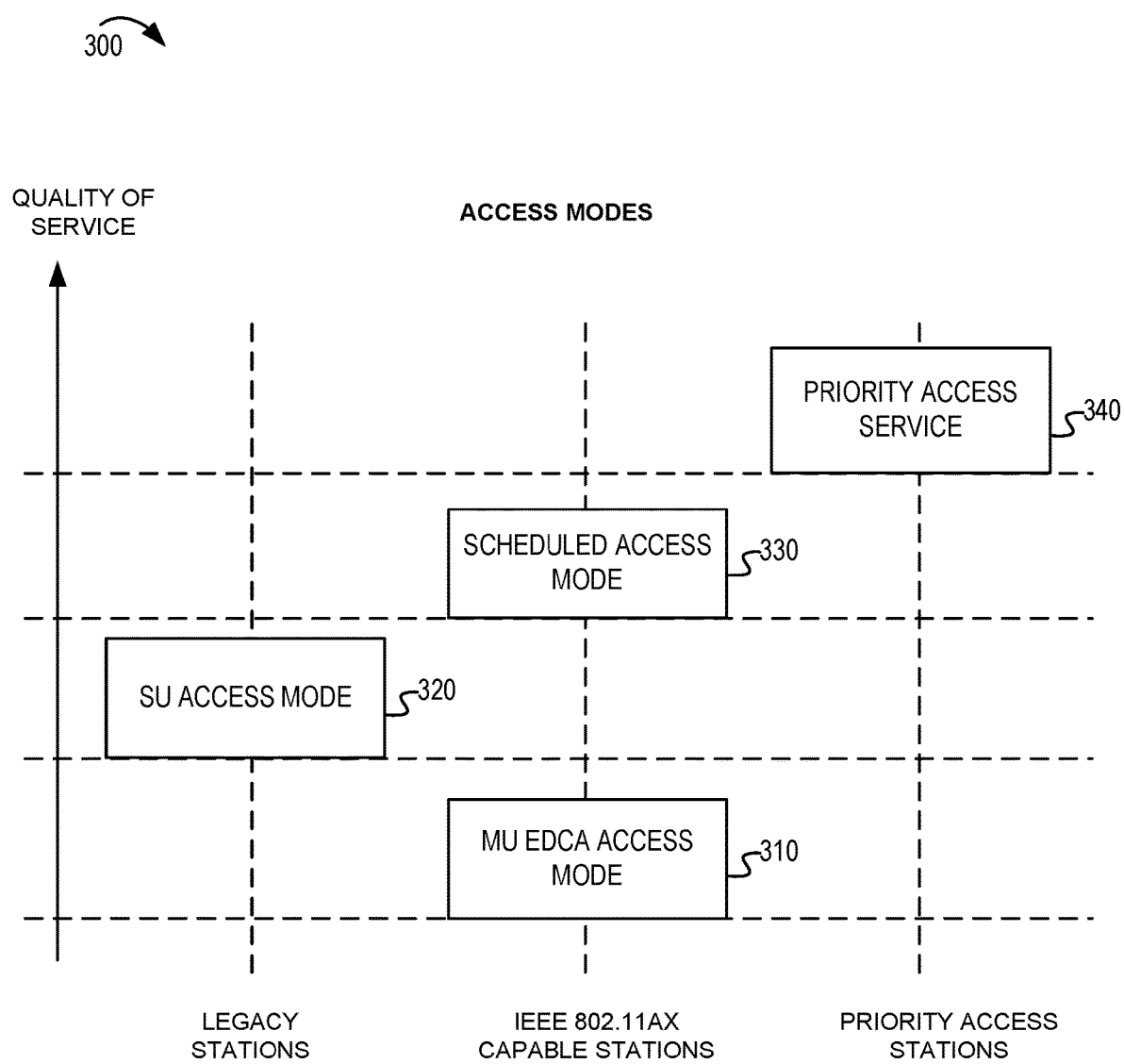
FIG. 3 shows example relationships between quality of service (QOS) and various access modes.
Figure 4:
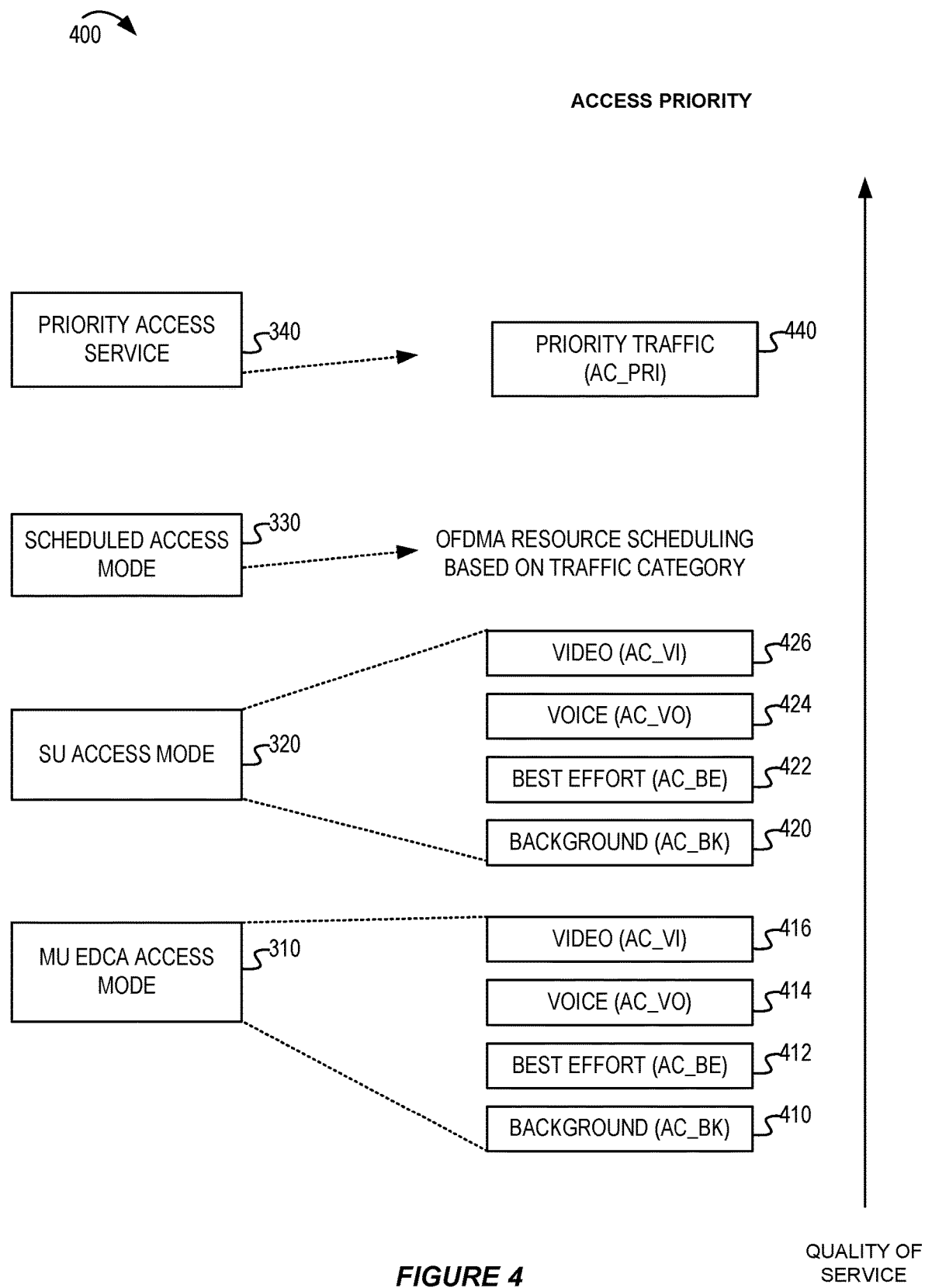
FIG. 4 shows example various access modes and various associated access classes.

In traditional WLAN deployments, a single user (SU) access mode was based on contention-based access in which a station obtains the use of the full channel up to a TXOP duration when it wins contention. Different priorities and access classes may be used by the WLAN to implement the prioritization of traffic. More recently, the IEEE draft 802.11ax technical standard implemented OFDMA which supports more efficient use of a wireless channel using either the scheduled access mode or the MU EDCA access mode. Using OFDMA and the scheduled access mode, the AP 102 may schedule airtime availability for different stations. Using OFDMA and the MU EDCA access mode, the AP 102 may trigger contention-based access for portions of a transmission opportunity by various STAs. However, it may be possible that the SU access mode provides a greater quality of service than the MU EDCA access mode since it includes full channel access or may have different contention parameters associated with the access categories. To provide a higher quality of service for the priority STA 144, the priority STA 144 may use a priority access service that is better than the existing access modes. FIGS. 3 and 4 provide more detail about how the priority access service compares to the existing access modes and access classes described in this disclosure.

Figure 2A:
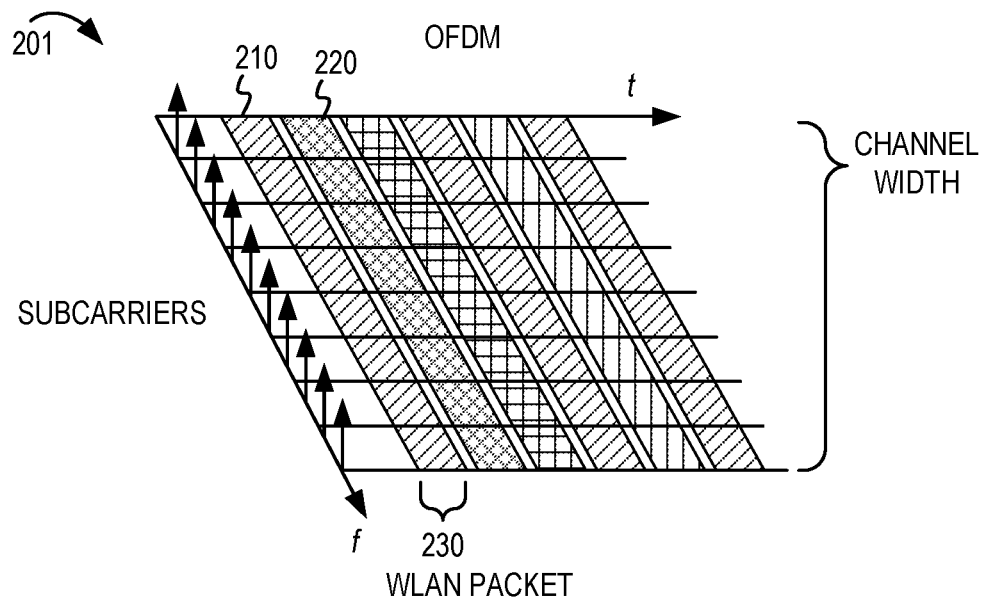
FIG. 2A shows an example conceptual diagram of orthogonal frequency division multiplexing (OFDM).

FIG. 2A shows an example conceptual diagram of OFDM 201. The OFDM channel width may include multiple subcarriers. A WLAN packet 230 (also referred to as a PPDU) includes data that is encoded using the subcarriers of the channel width. For example, a first STA may transmit a first PPDU 210 at a first time period. During a second time period, a second STA may transmit a second PPDU 220. The PPDUs 210 and 220 may be different lengths of time. Typically, the first STA and the second STA (and any other STAs in the BSS) will contend for access to the channel. Once the STA wins the contention, the STA can use the channel for transmission of a PPDU. As shown in FIG. 2A, different shading of the PPDUs indicates that different STAs may utilize the wireless channels sequentially, one at a time. However, this communication structure may be inefficient if a STA does not have enough data to justify using the full channel width. IEEE 802.11ax introduced the use of OFDMA in a WLAN.

Figure 2B:
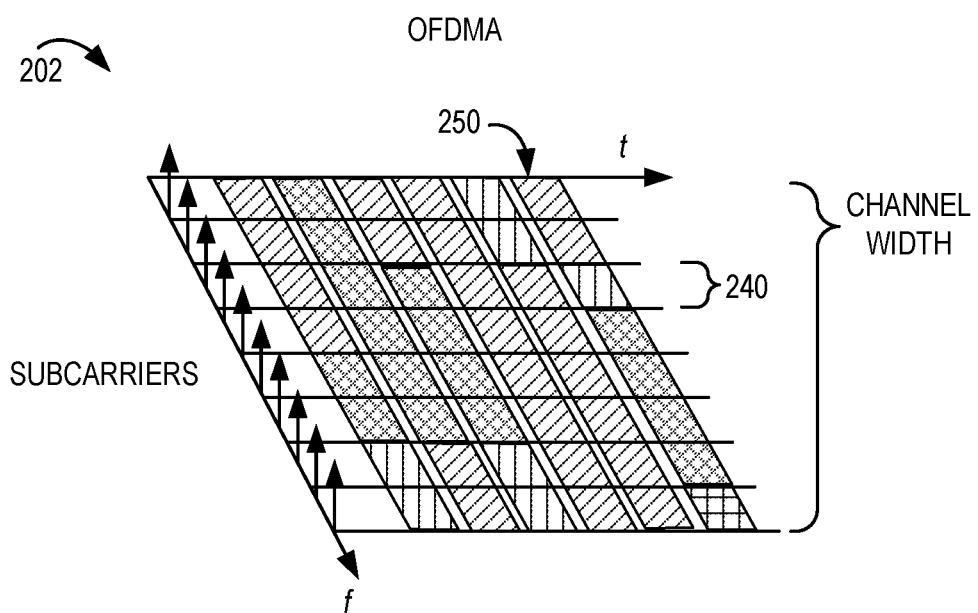
FIG. 2B shows an example conceptual diagram of orthogonal frequency division multiple access (OFDMA).

FIG. 2B shows an example conceptual diagram of OFDMA 202. OFDMA breaks down the channel width into a plurality of resource units (RUS). Each RU may include a different quantity of subcarriers. Using OFDMA, an AP may allocate different RUs for different STAs. For example, a PPDU 250 may include different RUs allocated for a first STA, a second STA, a third STA, and a fourth STA. One RU 240 is allocated for a STA to transmit data in the PPDU 250, while other RUs are allocated for different STAs. The allocation of RUs may be used to schedule channel access. For example, a trigger message from an AP may indicate which RUs are allocated to particular STAs to use for traffic in the PPDU that follows the trigger message.

The allocation of RUs may be used to schedule priority access. For example, an AP may transmit a trigger message that indicates which RUs are allocated to a priority STAs to use for priority access service in an UL MU PPDU that follows the trigger message. In some implementations, the AP may allocate some RUs (referred to as random access resource units, or RA-RUs) for contention-based access. One or more STAs may use an UL OFDMA-based random access (UORA) technique to transmit data via the RA-RUs.

FIG. 3 shows example relationships between QoS and various access modes. The SU access mode 320 provides quality of service based on the priority of access categories (as, for example, described in FIG. 4). Some legacy STAs may only support the SU access mode 320. For example, legacy STAs may include non-high-throughput (non-HT) STAs, high throughput (HT) STAs, or very high throughput (VHT) STAs, as described in IEEE 802.11 and amendments thereto. However, the WLAN protocols have evolved to support both more access modes. For example, IEEE 802.11ax describes high efficiency (HE) STAs that support the scheduled access mode 330 and the MU EDCA access mode 310). Because the MU scheduled access mode includes scheduling by an AP, the AP may control the scheduling of resources to support a greater quality of service using the scheduled access mode 330 compared to the SU access mode 320. However, it is possible that the MU EDCA access mode 310 provides a lower quality of service compared to the SU access mode 320 because the MU EDCA access mode 310 would be used to gain access to only portions of a transmission opportunity or only portions of the channel. The scheduled access mode 330 and the MU EDCA access mode 310 were introduced in IEEE 802.11ax and are supported by high efficiency (HE)-capable devices and expected to be supported by extremely high throughput (EHT)-capable devices.

A priority access service 340 may provide an even greater quality of service as compared to the scheduled access mode 330. The priority access service 340 may be based on one or more new access classes specified in a technical standard (such as IEEE 802.11be). The priority access service may be used by priority STAs. The priority access service 340 may be used on a per-STA basis depending on implementations or based on the QoS parameters supported by the priority access service 340.

In some implementations, the priority access service may be based on a modification of contention parameters for the SU access mode 320 or the MU EDCA access mode 310. For example, a priority STA may use more aggressive contention parameters for SU access contention or MU-EDCA contention. Non-priority STAs may use weaker contention parameters for the SU access contention or the MU-EDCA contention.

FIG. 4 shows example various access modes and various associated access classes. The chart 400 shows the relative quality of service for each AC defined for the access modes. The ACs may include access classes for background, best effort, voice, and video. For example, a background access class (AC_BK) 410 may have a lower quality of service compared to a best effort access class (AC_BE) 412. A voice access class (AC_VO) 414 may have a higher quality of service than the AC_BE 412. A video access class (AC_VI) 416 may have a higher quality of service than the AC_VO 414.

The quality of service for the access classes may be based on the contention parameters or levels of priority for each AC. The contention parameters may include a minimum contention window (CWmin), a maximum contention window (CWmax), an arbitration interframe space number (AIFSN), or a maximum transmission opportunity (TXOP) duration, among other examples. The contention parameters may be referred to as AIFSN[AC], CWmin[AC], CWmax[AC], TXOP Limit[AC], where the AC refers to a particular access class. Each STA may generate traffic streams related to the AC_VO, AC_VI, AC_BE, and AC_BK access classes. Each traffic stream may use contention parameters associated with each access class depending on the type of traffic in the traffic stream. Table 1 shows some example contention parameters for the access classes.

TABLE 1

Example contention parameters for access classes

| AC | CWmin | CWmax | AIFSN | Max TXOP |
|---|---|---|---|---|
| Video (AC_VI) | 7 | 15 | 2 | 3.008 milliseconds |
| Voice (AC_VO) | 3 | 7 | 2 | 1.504 milliseconds |
| Best Effort (AC_BE) | 15 | 1023 | 3 | 0 |
| Background (AC_BK) | 15 | 1023 | 7 | 0 |

As described in FIG. 3, the different access modes also impact the quality of service. For example, AC_BK 412 for the MU EDCA access mode 310 may be lower than the AC_BK 420 for the SU access mode 320. The SU access mode 320 may have similarly defined access classes as described above (AC_BK 420, AC_BE 422, AC_VO 424, and AC_VI 426). The scheduled access mode 330 may use traffic categories and scheduling of resources to provide a higher quality of service than can be provided by the SU access mode 320.

The priority access service 340 may provide a higher quality of service compared to the scheduled access mode 330. The priority access service 340 may define a new access class for priority traffic (AC_PRI) 440. The AC_PRI may be associated with different contention parameters that give a priority ATA a higher quality of service compared to the existing ACs defined for the SU access mode 320 and the MU EDCA access mode 310. For example, they may have a smaller AIFSN, more favorable contention windows, or larger TXOP durations, among other examples. Although illustrated as a separate priority access service, the AC_PRI 440 may be used with SU access or MU EDCA access modes.

In some implementations, the AP may advertise the contention parameters that are defined for the ACs. For example, the AP may transmit a beacon message, probe response, or another management frame that indicates the contention parameters. The AP may adjust the contention parameters for non-priority access classes as needed to support priority access by a priority STA.

Modifying the contention parameters (such as the CWmin, CWmax, AIFSN, and TXOP duration limit) may accomplished in a number of ways. In one example, the AP may transmit the modified contention parameters for each access class. In another example, each non-priority STA may modify their own contention parameters according to a predefined algorithm. For example, each non-priority STA may add an offset value to the CWmin, CWmax, or AIFSN, to increase the values associated with those parameters. In another example, each non-priority STA may decrease the TXOP duration limit based on a fixed or signaled offset value. The offset values used to modify the contention parameters may be signaled by the AP to its BSS or may be predefined in a standard technical specification.

In some implementations, modifying the contention parameters also may include changing a backoff algorithm. Typically, each STA starts an initial random backoff counter that causes a randomized delay before each STA attempts to access the wireless channel. The initial random backoff counter is selected from a range from zero to CWmin (which sets an upper limit for the initial backoff time). If the wireless channel is busy, the STA will double the initial random backoff counter up to a maximum value (CWmax). In some implementations, when a priority access service is being used by a priority STA, the other STAs may modify their backoff algorithm to give more favorable access to the priority STA. Examples of modifying the backoff algorithm may include disregarding the CWmin and selecting an initial random backoff counter between a range from zero to the CWmax (or the CWmax minus 1).

Although this disclosure describes an AC_PRI access class being different from the existing access classes, some implementations of priority access may utilize prioritization within an existing access class. For example, the priority access may be associated with a particular access class (such as the AC_VI access class or the AC_VO access class).

Among STAs within the particular access class, an AP may prioritize traffic for a priority STA above other STAs in that same access class.

Figure 5A:
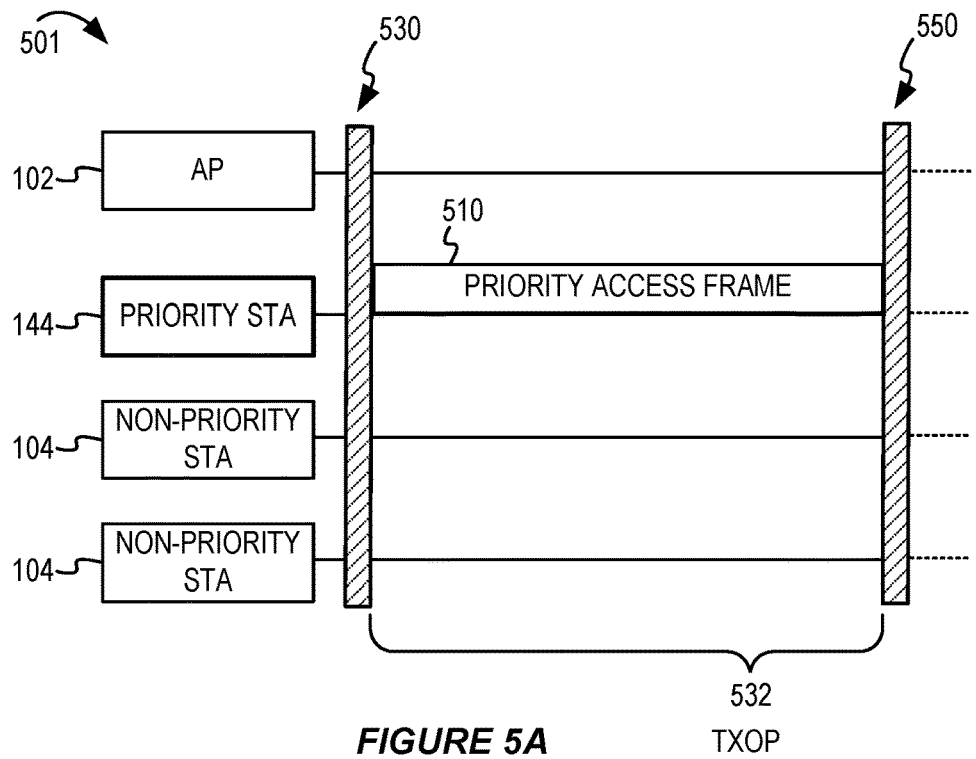
FIG. 5A shows an example conceptual timing diagram in which a priority station (STA) wins contention of a wireless channel.

FIG. 5A shows an example conceptual timing diagram 501 in which a priority STA wins contention of a wireless channel. The conceptual timing diagram 501 shows an AP 102, priority STA 144, and multiple other (non-priority STAs) 104 that share a wireless channel using contention-based access. At a first contention 530, the priority STA 144 wins the contention because either the priority STA 144 has more aggressive contention parameters, or because the AP 102 and other STAs 104 have less aggressive contention parameters, or both. The first contention 530 may be a contention period for SU access mode (as shown) or may be triggered by a MU-UL MIMO trigger message from the AP 102. In either case, the priority STA 144 is configured to use a priority access service. Therefore, the priority STA 144 has better contention parameters and wins the first contention 530. After winning the first contention 530, the priority STA 144 may transmit a priority access transmission (such as a priority access frame 510). The priority access transmission may include an indicator to specify that the priority STA 144 is using the priority access service. The priority STA 144 may maintain control of the wireless channel for a TXOP duration 532. In some implementations, a longer TXOP duration is permitted for priority STAs. Following the TXOP duration 532, a second contention 550 may occur. Once again, if the priority STA 144 still has priority traffic to transmit, the non-priority STA 114 may contend and win control for another TXOP (not shown) following the second contention 550.

Figure 5B:
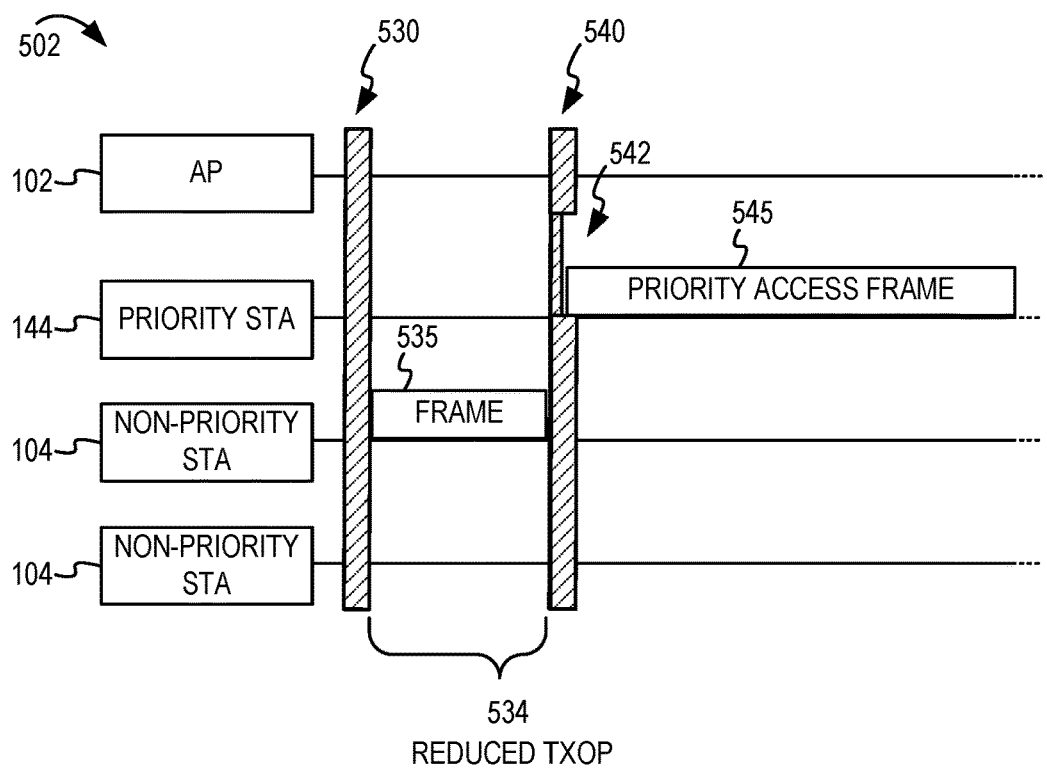
FIG. 5B shows an example conceptual timing diagram in which a non-priority STA initially wins contention of a wireless channel.

FIG. 5B shows an example conceptual timing diagram 502 in which a non-priority STA initially wins contention of a wireless channel. Although it is unlikely to occur, it is possible that a non-priority STA 104 may win a first contention 530 despite having weakened contention parameters. There may be multiple ways (as shown in FIG. 2B) to mitigate delay to the priority STA. One mechanism is to cause the non-priority STA 104 to use a reduced TXOP duration 534. For example, the AP 102 may have previously signaled TXOP duration limits for each access class. When the priority access service is enabled, the AP 102 may signal a reduced TXOP duration limit or may signal a priority service enablement indicator that causes the non-priority STAs 104 to use a reduced TXOP duration 534 if they should win contention. In some implementations, the reduced TXOP duration may be specified in a standard technical specification. During the reduced TXOP duration 534, since the non-priority STA 104 won contention, the non-priority STA 104 may transmit a non-priority frame 535.

FIG. 5B shows a second contention 540 that occurs after the non-priority frame 535. This provides an opportunity to describe another example mechanism for favoring the priority STA 144. Typically, after transmitting or detecting a transmission, each STA will wait for an interval of time, referred to as a distributed coordinated function (DCF) interframe space (DIFS), before attempting to access the wireless channel. The DIFS may define the beginning of the contention window. As shown in FIG. 5B, a priority STA 144 may use a reduced DIFS, such as a priority interframe space (PIFS) 542. The PIFS 542 may be less than the DIFS used by the other devices. As a result of using the PIFS 542 instead of the DIFS, the priority STA 144 may gain some additional advantage in winning the second contention 540. After winning the second contention 540, the priority STA 144 may transmit a priority access frame 545.

Figure 6A:
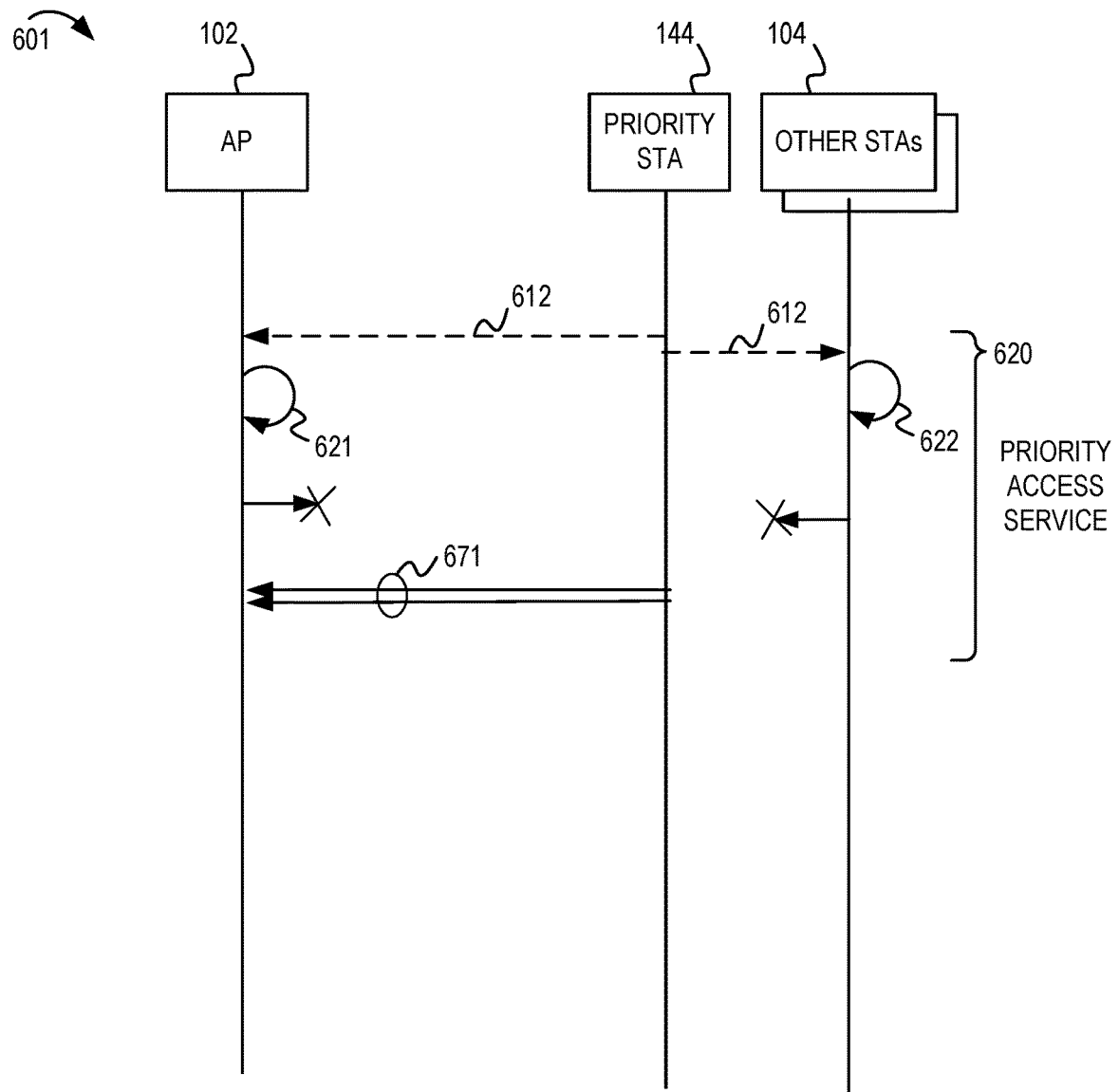
FIG. 6A shows an example message flow diagram in which all nearby devices support a priority access mode of a priority STA.

FIG. 6A shows an example message flow diagram in which all nearby devices support a priority access service of a priority STA. In this illustrative example 601, the AP 102 and other STAs 104 are capable of recognizing a priority access indicator in a transmission 612 from the priority STA 144. The priority STA 144 may be in the same BSS as the AP 102 and the other STAs 104 or may be in an OBSS. For example, the priority access indication may be included in a preamble or PHY header of a transmission from the priority STA 144. The other devices may be capable of interpreting the preamble or PHY header even if they do not belong to the same BSS as the priority STA 144. Upon receiving the transmission 612, the AP 102 may modify (shown at block 621) its own contention parameters to prevent the AP 102 from winning contention over the priority STA 144. Similarly, the other STAs 104 may modify (shown at block 622) their respective contention parameters to prevent them from winning contention over the priority STA 144. During the time that the priority STA 144 is transmitting priority transmissions 671, the priority STA 144 may be said to be using a priority access service 620.

Figure 6B:
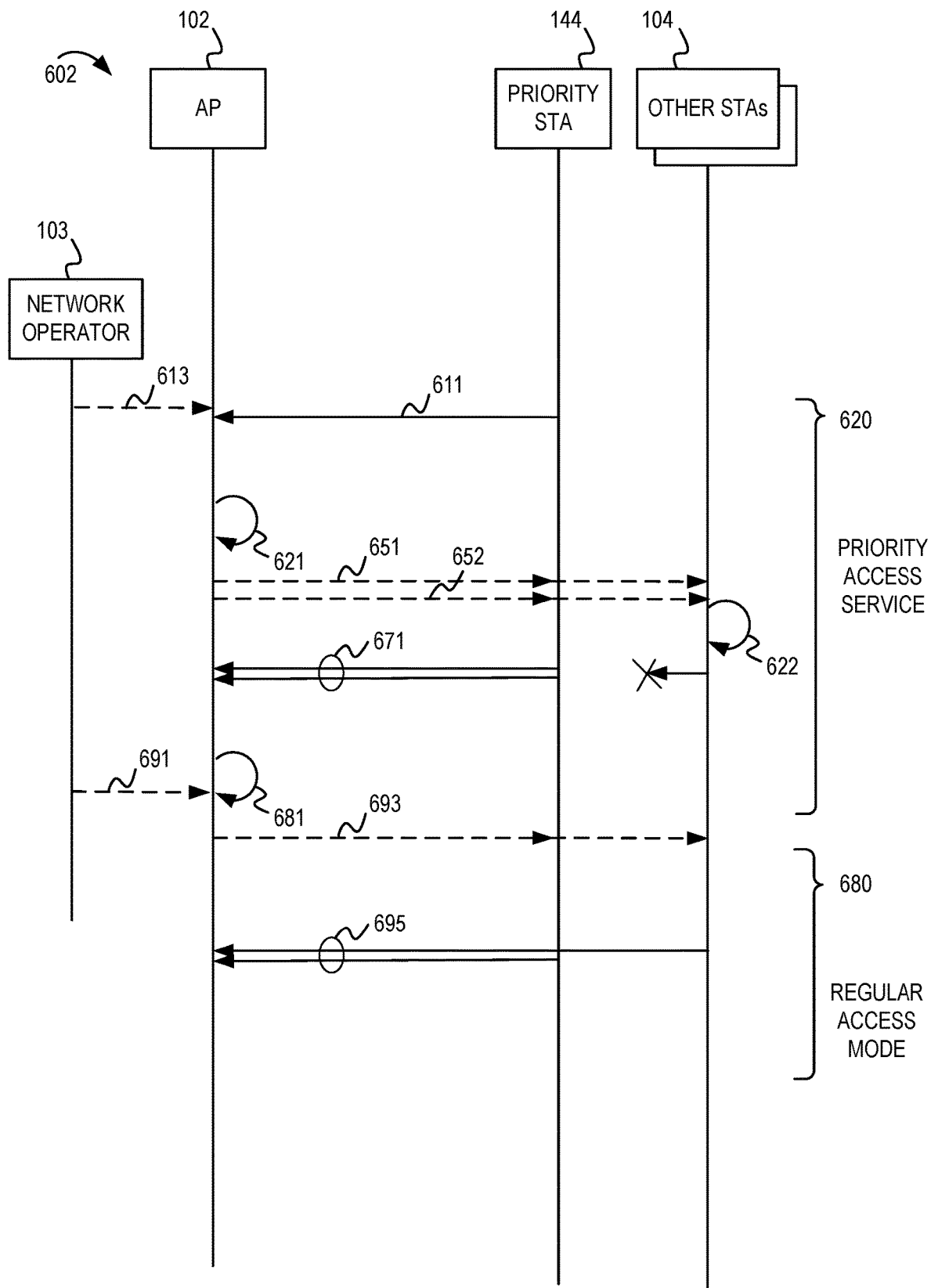
FIG. 6B shows an example message flow diagram in which an AP activates a priority access service of a priority STA.

FIG. 6B shows a message flow diagram in which an AP activates a priority access service of a priority STA. In this illustrative example 602, the AP 102 may determine that the priority STA 144 needs the priority access service. For example, the priority STA 144 may send a message (such as a priority access request message 611) that indicates the priority STA 144 is requesting the priority access service. The AP 102 may receive the priority access request message 611 from the priority STA 144. Alternatively, or additionally, the AP 102 may receive a priority service activation message 613 from a network operator 103 or another priority STA (not shown) in the BSS. The AP 102 may process (shown at block 621) the priority access request message 611 or the priority service activation message 613 and determine whether the priority STA 144 is authorized to use the priority access service. In some implementations, the, AP 102 may send a priority service response message (not shown) to the priority STA 144 to indicate that the priority access service was successfully enabled for the priority STA 144.

The AP 102 may determine changes to one or more settings for the STAs in the BSS to enhance the probability that the priority STA 144 will successfully win access to the wireless channel before other STAs. For example, the AP 102 may send one or more configuration messages 651 to 102 may modify the settings (such as contention parameters) in the BSS. The non-priority STAs 104 may modify (shown at block 622) their respective contention parameters to prevent them from winning contention over the priority STA 144. Alternatively, or additionally, the AP 102 may transmit a priority service enablement indicator 652 (such as a priority service response frame) to the priority STA 144 indicating that the priority STA 144 can use the priority access service. In some implementations, the priority service enablement indicator 652 may be included in a priority service activation notification sent to other APs (not shown) or any STAs in the vicinity of the AP 102. For example, the priority service activation notification may be a beacon frame or other management frame that informs the other STAs 104 or other APs (not shown) to adjust their respective EDCA parameters such that the priority STA 144 has a higher priority to utilize the wireless channel. The priority STA 144 may proceed with transmitting priority transmissions 671. During the time that the priority STA 144 is transmitting priority transmissions 671, the priority STA 144 may be said to be using a priority access service 620.

In some implementations, the priority access service may have a limited duration, such as a priority service event duration. The priority service event duration may be signaled in the priority access request message 611 or the priority service activation message 613. After the priority service event duration, the AP 102 may determine (shown at block 681) to end the priority access service 620. Alternatively, or additionally, the AP 102 may receive a management message from the network operator 103 indicating an end of the priority access service. The AP 102 may transmit configuration messages 693 to revert the regular access mode 680 settings. During the regular access mode 680, the priority STA 144 and the non-priority STAs 104 may have equal opportunity to win contention of the wireless channel based on existing access classes.

Figure 6C:
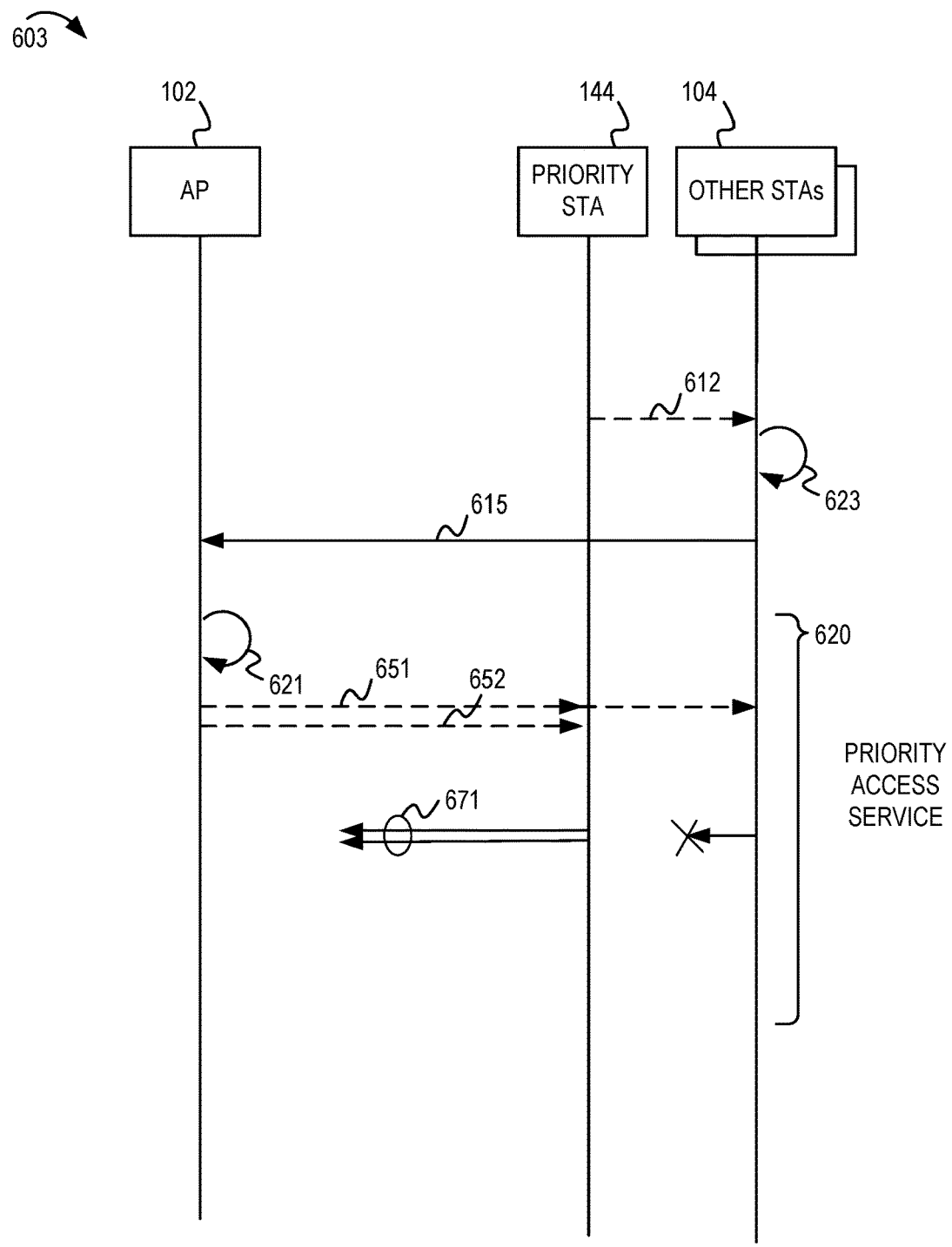
FIG. 6C shows an example message flow diagram in which a non-priority STA can enable priority access service on behalf of a priority STA.

FIG. 6C shows an example message flow diagram in which a non-priority STA can enable priority access service on behalf of a priority STA. In this illustrative example 603, one of the other STAs 104 may be capable of recognizing a priority access indicator in a transmission 612 from the priority STA 144. For example, the priority access indicator may be included in a preamble or PHY header of a transmission from the priority STA 144. The other devices may be capable of interpreting the preamble or PHY header even if they do not belong to the same BSS as the priority STA 144. Upon receiving the transmission 612, the other STA 104 may modify (shown at block 623) its respective contention parameters to prevent it from winning contention over the priority STA 144. However, other STAs 104 (or the AP 102) may be too far to properly receive the transmission 612 from the priority STA 144 that includes the priority access indicator. Furthermore, there may be legacy STAs (not shown) that are unable to interpret the priority access indicator. In both scenarios, the non-priority STA 104 that detects the priority access indicator can send a priority service detection indication 615 to the AP 102. The AP 102 may modify its contention parameters (shown at block 621). Furthermore, the AP 102 may send a priority service enable indicator or one or more configuration messages 651 to cause the STAs in its BSS to modify their contention parameters. Alternatively, or additionally, the AP 102 may transmit a priority service enablement indicator 652 (such as a priority service response frame) to the priority STA 144 indicating that the priority STA 144 can use the priority access service. Furthermore, in some implementations, the AP 102 may transmit a priority service activation notification (not shown) to any STAs or other APs to cause them to adjust their respective EDCA parameters such that the priority STA 144 has a higher priority to utilize the wireless channel.

Figure 7:
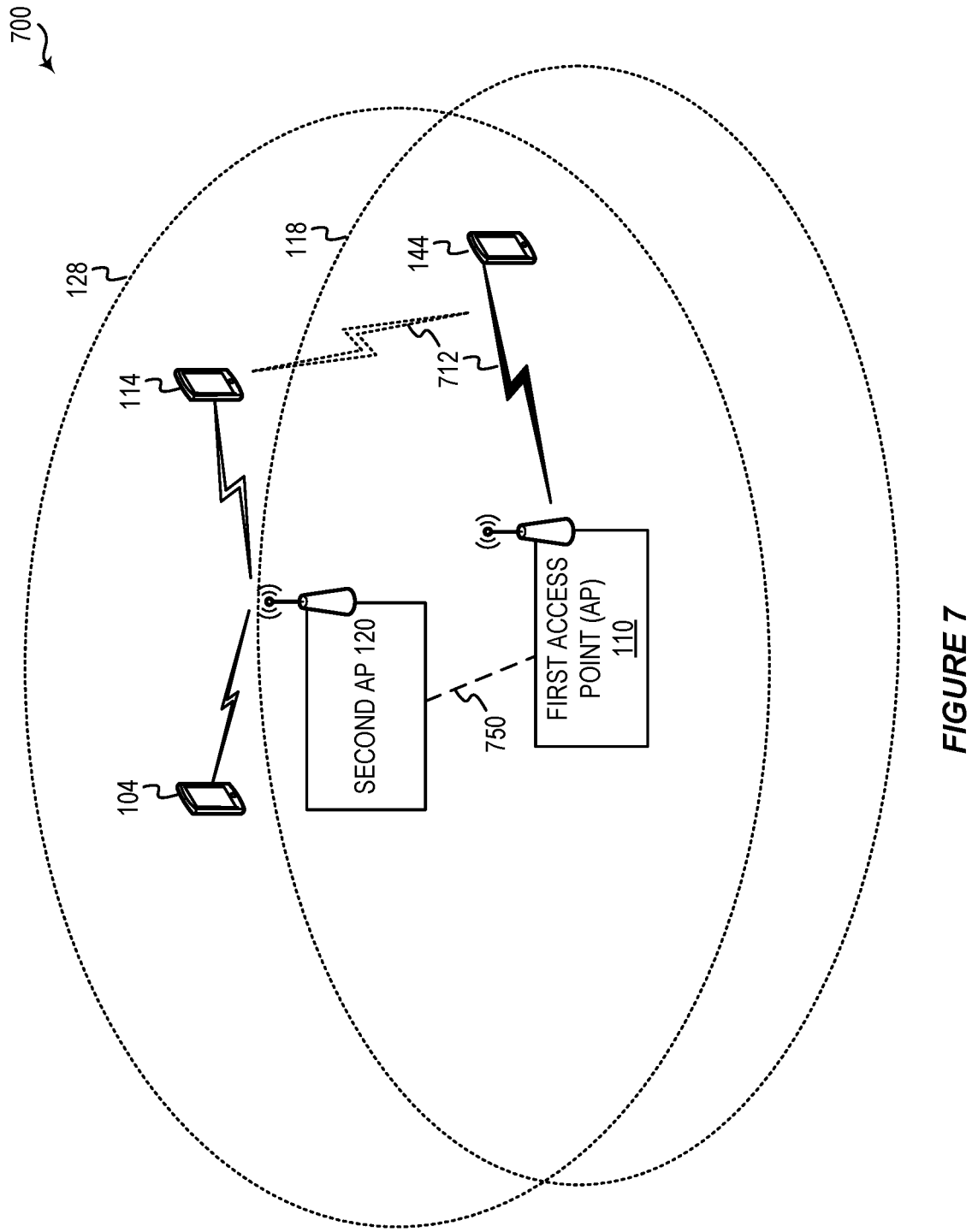
FIG. 7 shows a pictorial diagram of an example environment with overlapping basic service sets (OBSSs).

FIG. 7 shows a pictorial diagram of an example environment with OBSSs 700. A first BSS may be managed by a first AP 110. Similarly, a second BSS may be managed by a second AP 120. Each of the APs 110, 120 may be similar to the AP 102 described in FIG. 1. FIG. 7 additionally shows example coverage areas associated with each AP. For example, a first coverage area 118 of the AP 110 may represent a basic service area (BSA) of the first BSS. An example second coverage area 128 of the second AP 120 may form a BSA of the second BSS. Each BSS may be a network implementing at least one of the IEEE 802.11 family of standards (such as that defined by the IEEE 802.11-2016 specification or amendments thereof). Each AP may provide access to other networks (not shown). In some implementations, the second BSS managed by the second AP 120 may be referred to as an overlapping BSS (OBSS) in relation to the first BSS managed by the first AP 110. Each BSS may include numerous wireless communication devices such as an AP and a plurality of STAs. In this description, the first AP 110 is described as an access point using an infrastructure mode. However, in some implementations, the first AP 110 may be a STA which is operating as an AP. For example, the first AP 110 may be a STA capable of operating in a peer-to-peer mode or independent mode. In other examples, the first AP 110 may be a software AP (SoftAP) operating on a computer system.

In FIG. 7, the first BSS includes the first AP 110 and at least one priority STA 144. There also may be non-priority STAs (not shown) in the first BSS. The second BSS includes the second AP 120 and STAs 104 and 114. In the example of FIG. 7, the APs 110 and 120 may be configured to use a same wireless channel. For example, the first BSS and the second BSS may be referred to as OBSSs (or neighboring BSSs) because they are configured for the same wireless channel in the same location. Traditionally, the APs may share the wireless channel using either a time-based division of the wireless channel or by obtaining access through a contention-based procedure.

In one example of FIG. 7, one of the STAs of the second BSS may assist the second AP 120 to determine that a priority STA 144 requires a priority service via the wireless channel. For example, the first STA 114 and the second AP 120 may implement the message flow described with reference to FIG. 6C. A first STA 114 associated with the second AP 120 may detect a priority transmission 712 from the priority STA 144. Even though the priority STA 144 is in the first BSS (managed by the first AP 110), the preamble or PHY header of the priority transmission 712 may be detectable by the first STA 114. The first STA 114 may communicate with the second AP 120 to cause the second AP 120 to modify contention parameters for the STAs (including a legacy STA 104) associated with the second BSS managed by the second AP 120.

In another example described with reference to FIG. 7, the first AP 110 may determine that the priority STA 144 requires the priority service. The first AP 110 may communicate a priority service activation notification to the second AP 120 via a communication link 750. The communication link 750 may be a wireless communication link or may be a wired or networked communication link between the first AP 110 and the second AP 120. The priority service activation notification may inform the second AP 120 that the first AP 110 is activating the priority service. Upon receiving the priority service activation notification, the second AP 120 may adjust access classes or EDCA contention parameters for STAs in the second BSS (including the STAs 104 and 114 if they are non-priority STAs). Thus, the first AP 110 may enable priority service for the priority STA 144 to access a wireless channel by causing the second AP 120 to reduce EDCA parameters for non-priority STAs in an OBSS managed by the second AP 120.

In another example described with reference to FIG. 7, when the first AP 110 enables the priority service for the priority STA 144, the first AP 110 may broadcast a beacon frame or other management frame that includes a priority service activation notification. The second AP 120 may receive the priority service activation notification and adjust the EDCA parameters for non-priority STAs in the second BSS managed by the second AP 120.

Figure 8A:
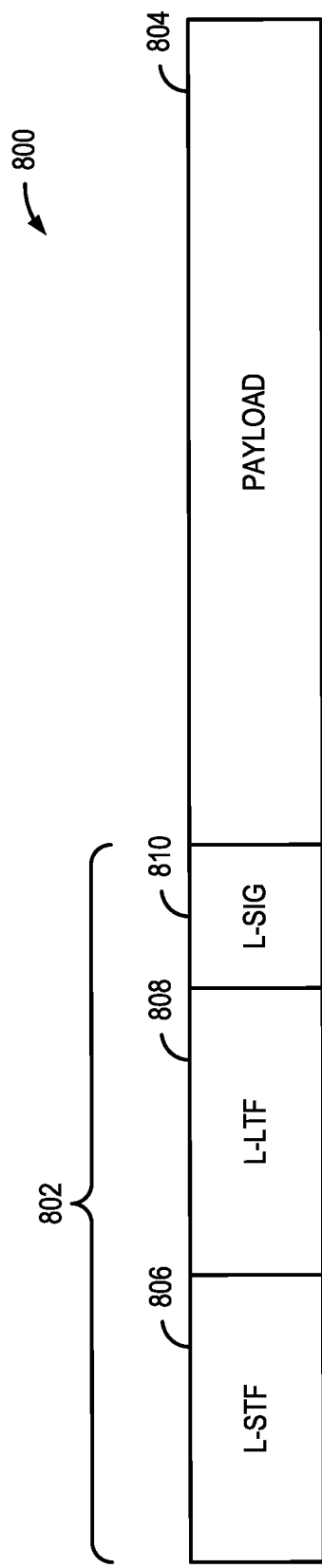
FIG. 8A shows an example protocol data unit (PDU) usable for communications between an access point (AP) and a STA.

FIG. 8A shows an example protocol data unit (PDU) 800 usable for communications between an AP and a number of STAs. For example, the PDU 800 can be configured as a PPDU. As shown, the PDU 800 includes a PHY preamble 802 and a PHY payload 804. For example, the PHY preamble 802 may include a legacy portion that itself includes a legacy short training field (L-STF) 806, a legacy long training field (L-LTF) 808, and a legacy signaling field (L-SIG) 810. The PHY preamble 802 also may include a non-legacy portion (not shown). The L-STF 806 generally enables a receiving device to perform automatic gain control (AGC) and coarse timing and frequency estimation. The L-LTF 808 generally enables a receiving device to perform fine timing and frequency estimation and also to estimate the wireless channel. The L-SIG 810 generally enables a receiving device to determine a duration of the PDU and use the determined duration to avoid transmitting on top of the PDU. For example, the L-STF 806, the L-LTF 808 and the L-SIG 810 may be modulated according to a binary phase shift keying (BPSK) modulation scheme. The payload 804 may be modulated according to a BPSK modulation scheme, a quadrature BPSK (Q-BPSK) modulation scheme, a quadrature amplitude modulation (QAM) modulation scheme, or another appropriate modulation scheme. The payload 804 may generally carry higher layer data, for example, in the form of medium access control (MAC) protocol data units (MPDUs) or an aggregated MPDU (A-MPDU).

Figure 8B:
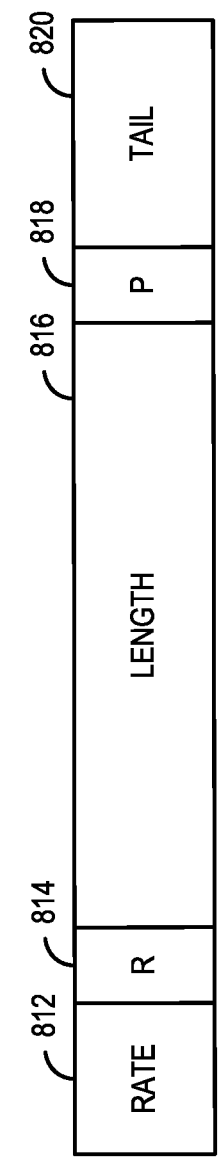
FIG. 8B shows an example field in the PDU of FIG. 8A.

FIG. 8B shows an example L-SIG field 810 in the PDU of FIG. 8A. The L-SIG 810 includes a data rate field 812, a reserved bit 814, a length field 816, a parity bit 818, and a tail field 820. The data rate field 812 indicates a data rate (note that the data rate indicated in the data rate field 812 may not be the actual data rate of the data carried in the payload 804). The length field 816 indicates a length of the packet in units of, for example, bytes. The parity bit 818 is used to detect bit errors. The tail field 820 includes tail bits that are used by the receiving device to terminate operation of a decoder (for example, a Viterbi decoder). The receiving device utilizes the data rate and the length indicated in the data rate field 812 and the length field 816 to determine a duration of the packet in units of, for example, microseconds (μs).

In some implementations, the L-SIG 810 or a PHY header in the payload 804 may be modified to include one or more indicators described in this disclosure, such as the priority access indication, the priority detection indicator, the priority service duration, or the priority service enablement indicator. The indicators may be signaled using one or more bits of the preamble or PHY header.

In some implementations, a priority STA or an AP may use a management frame (such as a beacon frame, probe response frame, generic advertisement service (GAS) message, among other examples) to indicate that the wireless communication device supports priority access service.

Figure 9:
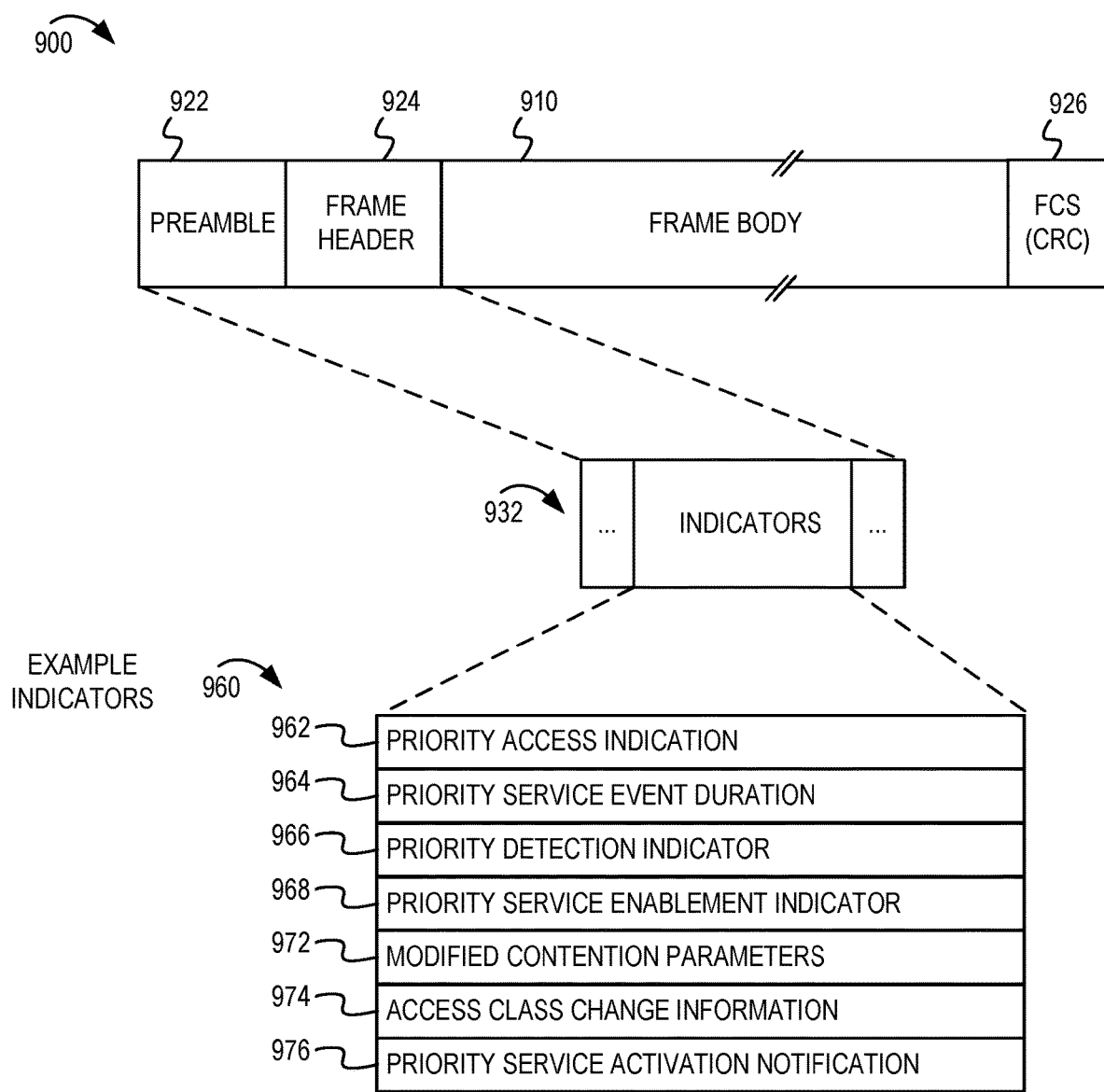
FIG. 9 shows a conceptual diagram of an example message format for communicating priority access information.

FIG. 9 shows a conceptual diagram of an example format of a message 900 for communicating priority access information. For example, a priority STA 144 may transmit the message 900 to the AP 102 or another STA 104. The AP 102 may transmit the message 900 to the priority STA 144 or another STA 104. The message 900 may include one or more indicators (or information elements) that include priority access information. In some implementations, the message 900 is transmitted in the form of a PPDU. The message 900 (which also may be formatted as a PPDU) may include a preamble 922, a frame header 924, a frame body 910, and a frame check sequence (FCS) 926. The preamble 922 may include one or more bits to establish synchronization. The frame header 924 may include source and destination network addresses (such as the network address of the sending AP and receiving AP, respectively), the length of the data frame, or other frame control information. The frame body 910 may include a variety of indicators 932.

FIG. 9 includes several example indicators 960. The indicators may be included as one or more bits of the preamble 922 or the frame header 924, as shown in FIG. 9. Alternatively, the indicators may be included as information elements or fields of a management message (not shown) in payload of the frame body 910. The example indicators 960 include a priority access indicator 962. In some implementations, the priority access indicator 962 may be included in every priority transmission from a priority STA. The example indicators 960 may include a priority service event duration 964 specifying a duration of the priority access service. The example indicators 960 may include a priority service enablement indicator 968. The priority service enablement indicator 968 may be included in a message from an AP to its BSS. The example indicators 960 may include modified contention parameters 972. For example, the AP 102 may include contention parameters for each access class (potentially including the new AC_PRI) in a configuration message to the BSS. The example indicators 960 may include access class change information 974. For example, an AP 102 may cause some STAs to change to a lower access class to provide support for the priority access by the priority STA. The example indicators 960 may include a priority service activation notification 974 to inform STAs or other APs that the priority service has been activated for a priority STA.

The examples in FIG. 9 are provided for pedagogical purposes and other examples messages may be within the scope of this disclosure. For example, the message 900 may be a priority access request frame formatted to include a request to activate the priority access service. A priority access request frame may include a request indicator, a security token, a duration, or any combination thereof. In another example, the message 900 may be a priority access response frame formatted to include a either a success or failure to activate the priority access service. In yet another example, the message 900 may be a management or configuration frame that indicates whether the sending WLAN device (such as an AP or a priority STA) supports the priority access service.

Figure 10:
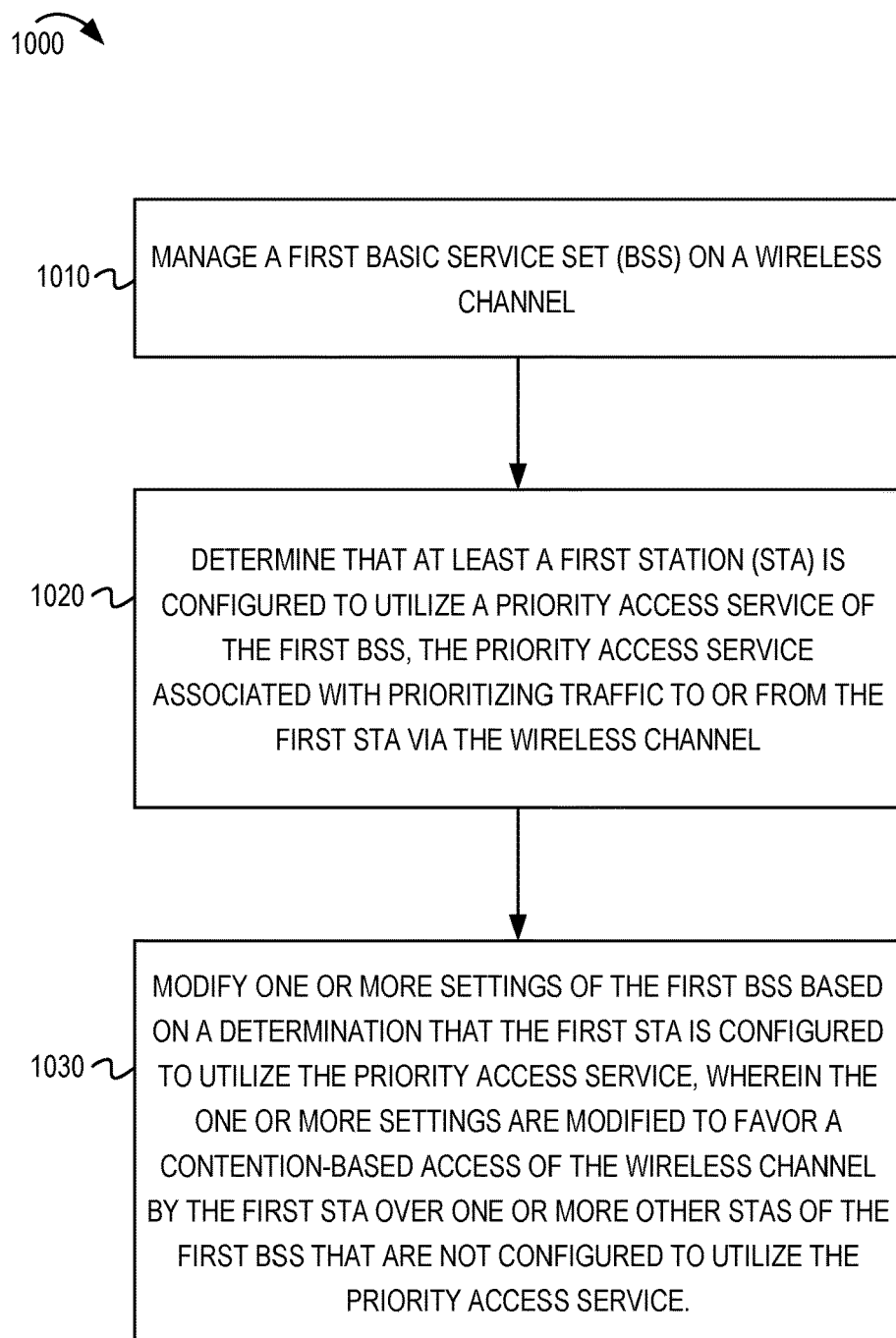
FIG. 10 shows a flowchart illustrating an example process by an AP to support priority access.

FIG. 10 shows a flowchart illustrating an example process 1000 by an AP to support priority access. In some implementations, the process 1000 may be performed by a wireless communication device such as the AP 102 described above. In some implementations, the process 1000 begins in block 1010. In block 1010, an AP may manage a first basic service set (BSS) on a wireless channel. In block 1020, the AP may determine that at least a first station (STA) is configured to utilize a priority access service of the first BSS, the priority access service associated with prioritizing traffic to or from the first STA via the wireless channel. In block 1030, the AP may modify one or more settings of the first BSS based on a determination that the first STA is configured to utilize the priority access service, where the one or more settings are modified to favor a contention-based access of the wireless channel by the first STA over one or more other STAs of the first BSS that are not configured to utilize the priority access service.

Figure 11:
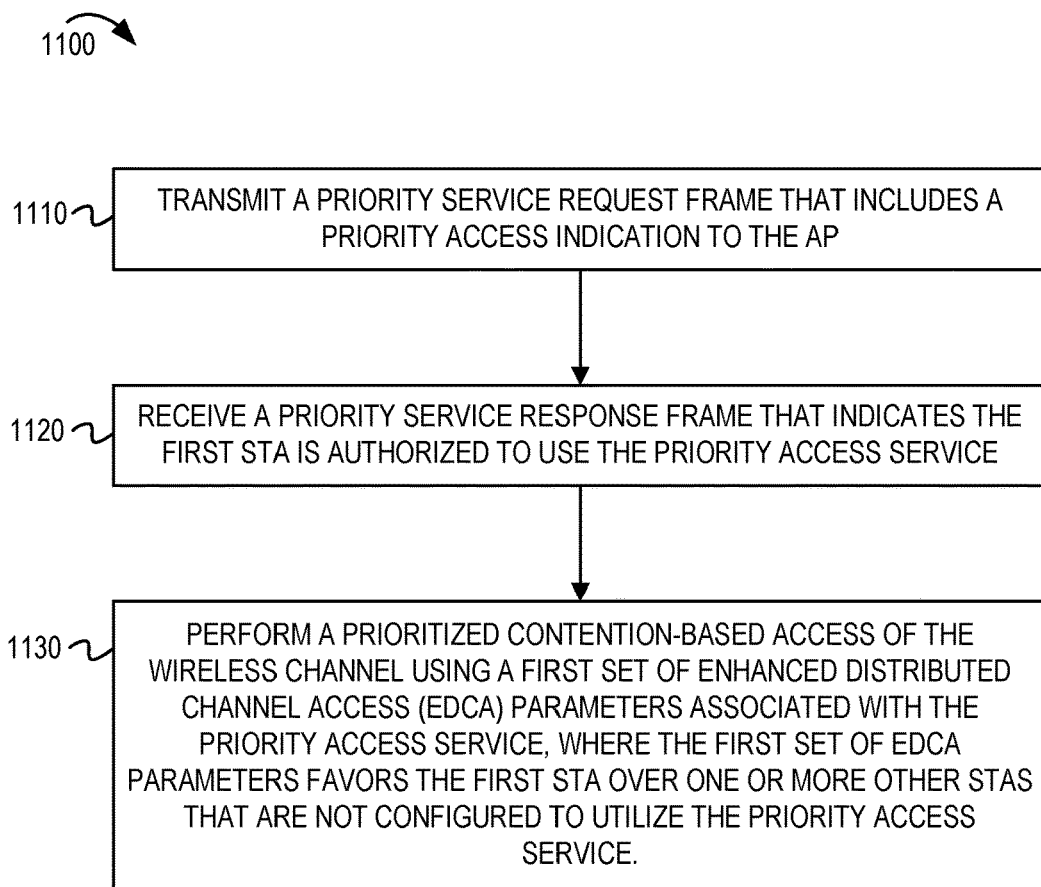
FIG. 11 shows a flowchart illustrating an example process by a priority STA to implement priority access.

FIG. 11 shows a flowchart illustrating an example process 1100 by a priority STA to implement priority access. In some implementations, the process 1100 may be performed by a wireless communication device such as the priority STA 144 described above. In some implementations, the process 1100 begins in block 1110. In block 1110, the priority STA may transmit a priority service request frame that includes a priority access indication to the AP. In block 1120, the priority STA may receive a priority service response frame that indicates the first STA is authorized to use the priority access service. In block 1130, the priority STA may perform a prioritized contention-based access of the wireless channel using a first set of enhanced distributed channel access (EDCA) parameters associated with the priority access service, where the first set of EDCA parameters favors the first STA over one or more other STAs that are not configured to utilize the priority access service.

Figure 12:
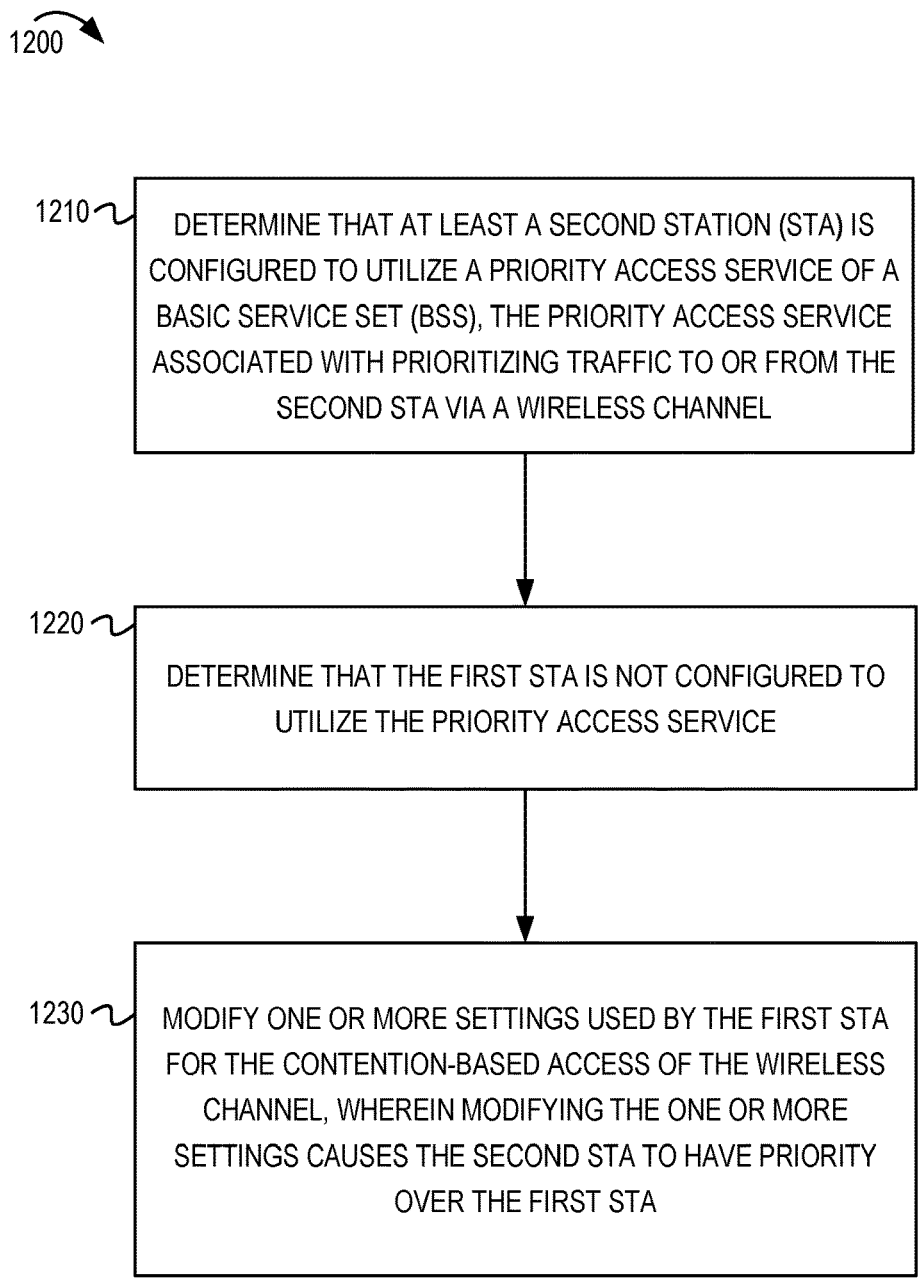
FIG. 12 shows a flowchart illustrating an example process by a non-priority STA to support priority access.

FIG. 12 shows a flowchart illustrating an example process by a non-priority STA to support priority access. In some implementations, the process 1200 may be performed by a wireless communication device such as the STAs 104 described above. In some implementations, the process 1200 begins in block 1210. In block 1210, a first STA may determine that at least a second station (STA) is configured to utilize a priority access service of a basic service set (BSS), the priority access service associated with prioritizing traffic to or from the second STA via a wireless channel. In block 1220, the first STA may determine that the first STA is not configured to utilize the priority access service. In block 1230, the first STA may modify one or more settings used by the first STA for the contention-based access of the wireless channel, where modifying the one or more settings causes the second STA to have priority over the first STA.

Figure 13:
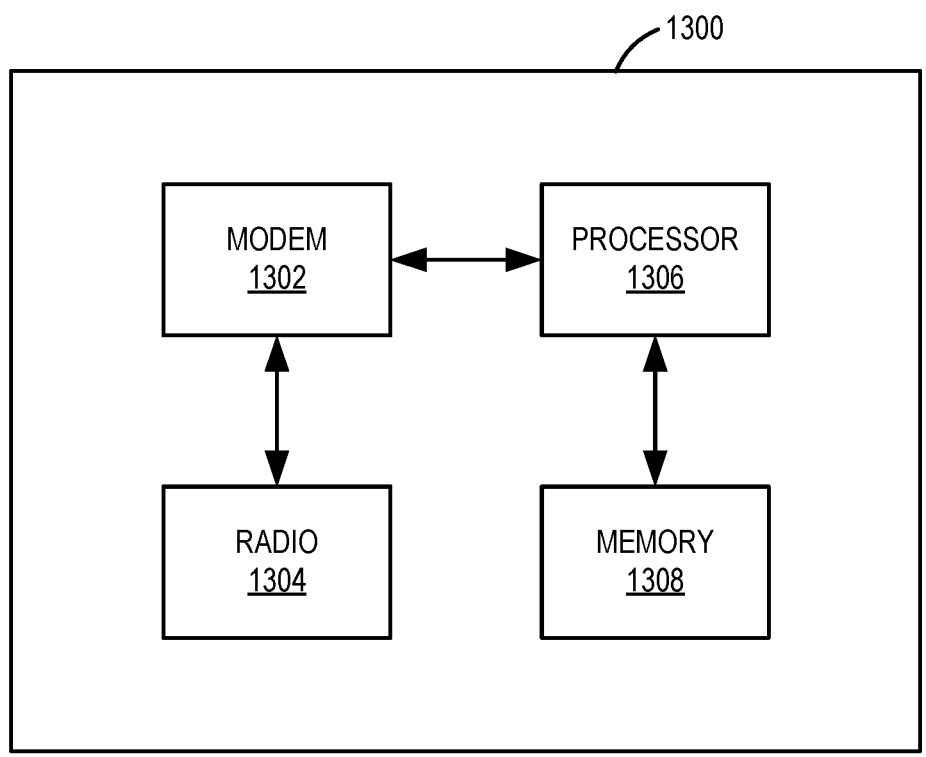
FIG. 13 shows a block diagram of an example wireless communication device.

FIG. 13 shows a block diagram of an example wireless communication device 1300. In some implementations, the wireless communication device 1300 can be an example of a device for use in a STA such as one of the STAs 104 or 144 described above with reference to FIG. 1. In some implementations, the wireless communication device 1300 can be an example of a device for use in an AP such as the AP 102 described above with reference to FIG. 1. The wireless communication device 1300 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 1300 can be, or can include, a chip, system on chip (SoC), chipset, package or device that includes one or more modems 1302, for example, a Wi-Fi (IEEE 802.11 compliant) modem. In some implementations, the one or more modems 1302 (collectively "the modem 1302") additionally include a WWAN modem (for example, a 3GPP 4G LTE or 5G compliant modem). In some implementations, the wireless communication device 1300 also includes one or more radios 1304 (collectively "the radio 1304"). In some implementations, the wireless communication device 1300 further includes one or more processors, processing blocks or processing elements 1306 (collectively "the processor 1306") and one or more memory blocks or elements 1308 (collectively "the memory 1308").

The modem 1302 can include an intelligent hardware block or device such as, for example, an application-specific integrated circuit (ASIC) among other possibilities. The modem 1302 is generally configured to implement a PHY layer. For example, the modem 1302 is configured to modulate packets and to output the modulated packets to the radio 1304 for transmission over the wireless medium. The modem 1302 is similarly configured to obtain modulated packets received by the radio 1304 and to demodulate the packets to provide demodulated packets. In addition to a modulator and a demodulator, the modem 1302 may further include digital signal processing (DSP) circuitry, automatic gain control (AGC), a coder, a decoder, a multiplexer and a demultiplexer. For example, while in a transmission mode, data obtained from the processor 1306 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1304. In implementations involving beamforming, the modulated symbols in the respective spatial streams are precoded via a steering matrix prior to their provision to the IFFT block.

While in a reception mode, digital signals received from the radio 1304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1306) for processing, evaluation, or interpretation.

The radio 1304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1300 can include, or be coupled with, multiple transmit antennas (each with a corresponding transmit chain) and multiple receive antennas (each with a corresponding receive chain). The symbols output from the modem 1302 are provided to the radio 1304, which then transmits the symbols via the coupled antennas. Similarly, symbols received via the antennas are obtained by the radio 1304, which then provides the symbols to the modem 1302.

The processor 1306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1306 processes information received through the radio 1304 and the modem 1302, and processes information to be output through the modem 1302 and the radio 1304 for transmission through the wireless medium. For example, the processor 1306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1306 may generally control the modem 1302 to cause the modem to perform various operations described above.

The memory 1304 can include tangible storage media such as random-access memory (RAM) or read-only memory (ROM), or combinations thereof. The memory 1304 also can store non-transitory processor- or computer-executable software (SW) code containing instructions that, when executed by the processor 1306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 14B:
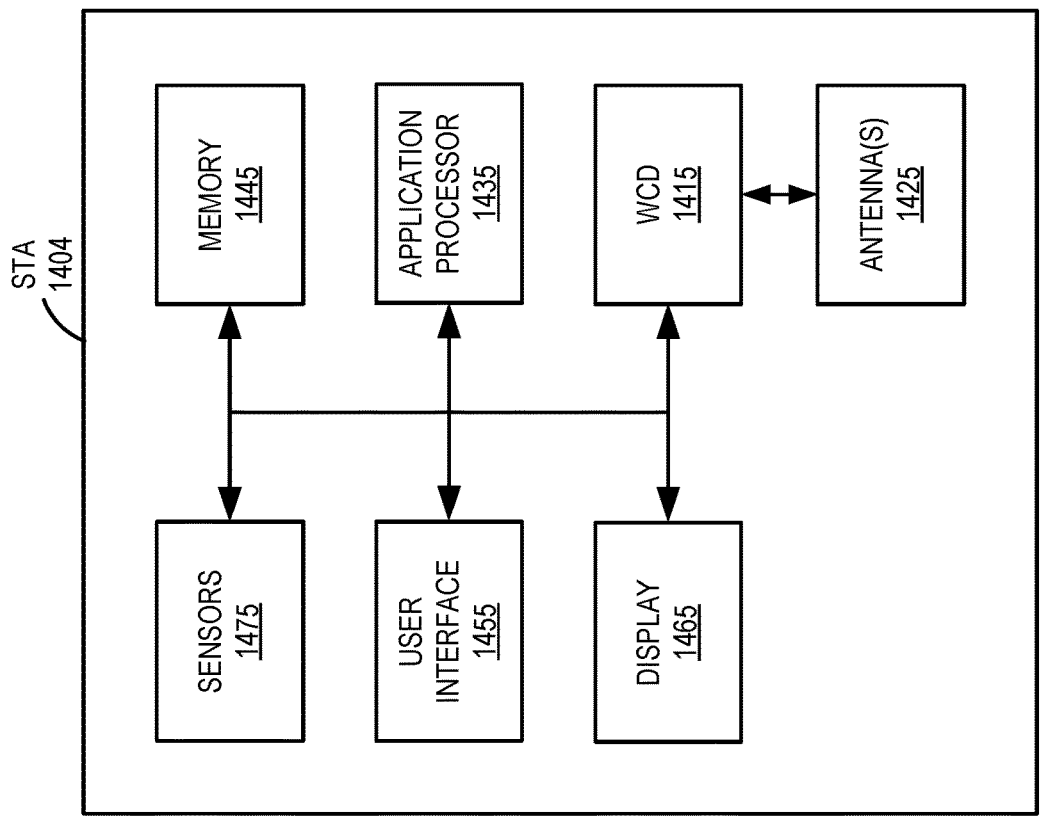
FIG. 14B shows a block diagram of an example STA.
Figure 14A:
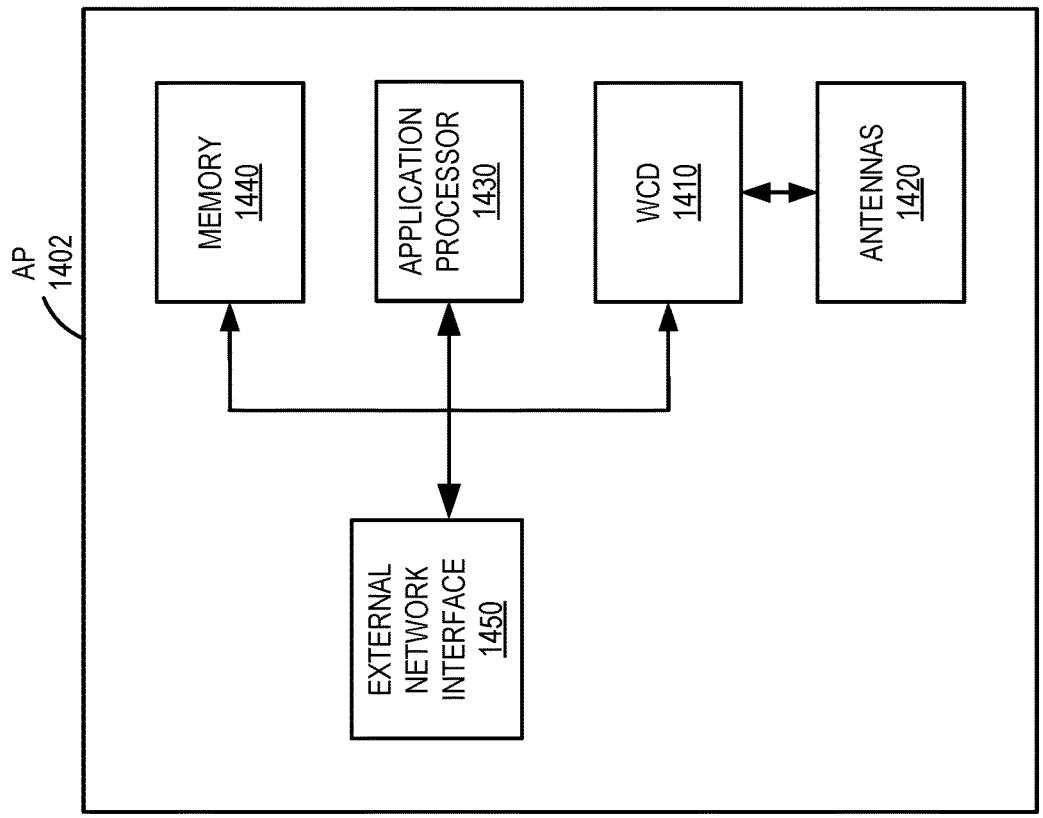
FIG. 14A shows a block diagram of an example AP.

FIG. 14A shows a block diagram of an example AP 1402. For example, the AP 1402 can be an example implementation of the AP 102 described with reference to FIG. 1. The AP 1402 includes a wireless communication device (WCD) 1410 (although the AP 1402 may itself also be referred to generally as a wireless communication device as used herein). For example, the wireless communication device 1410 may be an example implementation of the wireless communication device 13000 described with reference to FIG. 13. The AP 1402 also includes multiple antennas 1420 coupled with the wireless communication device 1410 to transmit and receive wireless communications. In some implementations, the AP 1402 additionally includes an application processor 1430 coupled with the wireless communication device 1410, and a memory 1440 coupled with the application processor 1430. The AP 1402 further includes at least one external network interface 1450 that enables the AP 1402 to communicate with a core network or backhaul network to gain access to external networks including the Internet. For example, the external network interface 1450 may include one or both of a wired (for example, Ethernet) network interface and a wireless network interface (such as a WWAN interface). Ones of the aforementioned components can communicate with other ones of the components directly or indirectly, over at least one bus. The AP 1402 further includes a housing that encompasses the wireless communication device 1410, the application processor 1430, the memory 1440, and at least portions of the antennas 1420 and external network interface 1450.

FIG. 14B shows a block diagram of an example STA 1404. For example, the STA 1404 can be an example implementation of the STA 104 described with reference to FIG. 1. The STA 1404 includes a wireless communication device 1415 (although the STA 1404 may itself also be referred to generally as a wireless communication device as used herein). For example, the wireless communication device 1415 may be an example implementation of the wireless communication device 1300 described with reference to FIG. 13. The STA 1404 also includes one or more antennas 1425 coupled with the wireless communication device 1415 to transmit and receive wireless communications. The STA 1404 additionally includes an application processor 1435 coupled with the wireless communication device 1415, and a memory 1445 coupled with the application processor 1435. In some implementations, the STA 1404 further includes a user interface (UI) 1455 (such as a touchscreen or keypad) and a display 1465, which may be integrated with the UI 1455 to form a touchscreen display. In some implementations, the STA 1404 may further include one or more sensors 1475 such as, for example, one or more inertial sensors, accelerometers, temperature sensors, pressure sensors, or altitude sensors. Ones of the aforementioned components can communicate with other ones of the components directly or indirectly, over at least one bus. The STA 1404 further includes a housing that encompasses the wireless communication device 1415, the application processor 1435, the memory 1445, and at least portions of the antennas 1425, UI 1455, and display 1465.

FIGS. 1-14B and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

In some implementations, a method may be performed by an AP of a WLAN. The method may include managing a first BSS on a wireless channel. The method may include determining that at least a first STA is configured to utilize a priority access service on the wireless channel. The method may include modifying one or more settings of the first BSS based on a determination that the first STA is configured to utilize the priority access service. The one or more settings may be modified to favor a contention-based access of the wireless channel by the first STA over one or more other STAs of the first BSS that are not configured to utilize the priority access service.

In some implementations, determining that the at least first STA is configured to utilize the priority access service may include at least one of: receiving, by the AP, a message from a network operator that includes a priority access enablement indicator, receiving, from a second STA associated with the first BSS, a priority access detection indicator that indicates that the second STA has detected a priority transmission from the first AP, and detecting, by the AP, a transmission from the first STA that includes a priority access indication.

In some implementations, one or more bits of a preamble or a PHY header of the transmission from the first STA is populated with the priority access indication.

In some implementations, the transmission may include a priority service duration. The method may include reverting the one or more settings of the first BSS after the priority service duration.

In some implementations, modifying one or more settings of the first BSS includes signaling a priority service enablement indicator in the first BSS.

In some implementations, signaling the priority service enablement indicator includes outputting, for transmission via a wireless communication interface, a management frame that includes the priority service enablement indicator.

In some implementations, the management frame is a beacon frame. The priority service enablement indicator may be included in an operation element of the beacon frame.

In some implementations, the first STA is associated with a second BSS different from the first BSS. The first BSS and the second BSS may be OBSSs.

In some implementations, the priority access service is associated with a PIFS that is shorter than a DIFS used by the one or more other STAs.

In some implementations, modifying the one or more settings includes enabling a priority access class (AC_PRI) for the first STA based on the determination that the first STA is configured to utilize the priority access service.

In some implementations, the AC_PRI is associated with a first set of EDCA parameters that is different from other access classes for the one or more other STAs.

In some implementations, the AC_PRI has different EDCA parameters from those of a voice access class (AC_VO), a video access class (AC_VI), a best effort access class (AC_BE), or a background access class (AC_BK) used by the one or more other STAs.

In some implementations, the method may include advertising the AC_PRI in a beacon message.

In some implementations, modifying the one or more settings includes causing the one or more other STAs to use a different access class for the contention-based access of the wireless channel.

In some implementations, modifying the one or more settings includes causing the one or more other STAs to use a reduced TXOP duration when they win the contention-based access of the wireless channel.

In some implementations, the method may include modifying the one or more settings includes causing the one or more other STAs to adjust one or more EDCA parameters for the contention-based access of the wireless channel.

In some implementations, the method may include causing the one or more other STAs to adjust one or more EDCA parameters includes causing the one or more STAs to change an AIFSN setting, a CWmin setting, or a CWmax setting.

In some implementations, causing the one or more other STAs to adjust one or more EDCA parameters includes causing the one or more STAs to apply an offset value to an AIFSN setting, a CWmin setting, or a CWmax setting.

In some implementations, the offset value is specified in a standard technical specification.

In some implementations, the method may include signaling the offset value in a management message from the AP to the one or more other STAs.

In some implementations, the one or more other STAs includes a second STA. In some implementations, causing the one or more other STAs to apply the offset value includes applying a first offset value to one or more EDCA parameters if the second STA is using a first access class, and applying a second offset value to the one or more EDCA parameters if the second STA is using a second access class.

In some implementations, causing the one or more other STAs to adjust one or more EDCA parameters includes causing the one or more other STAs to use a modified algorithm for determining an initial backoff wait time for the contention-based access of the wireless channel.

In some implementations, the modified algorithm ignores a CWmin setting for determining the initial backoff wait time.

In some implementations, the modified algorithm is configured to determine the initial backoff wait time within a range from zero to one less than a CWmax setting.

In some implementations, the method may include, before modifying the one or more settings, determining whether the first STA is authorized to utilize the priority access service, and modifying the one or more settings if the first STA is authorized to utilize the priority access service.

In some implementations, the method may include preventing the first STA from obtaining favorable contention-based access if the first STA is not authorized to utilize the priority access service.

In some implementations, preventing the first STA from obtaining the favorable contention-based access includes one or more countermeasures. The countermeasures may include disassociating the first STA from the first BSS if the first STA is associated with the first BSS or modifying one or more EDCA parameters for the one or more other STAs.

In some implementations, a method performed by a first STA of a WLAN. The first STA may be configured to utilize a priority access service on a wireless channel. In some implementations, the method may include outputting, via a wireless communication interface, a transmission that includes a priority access indication.

The method may include using a first set of EDCA parameters for a contention-based access of the wireless channel. The first set of EDCA parameters may favor the first STA over one or more other STAs that are not configured to utilize the priority access service.

In some implementations, the transmission is a PPDU.

In some implementations, one or more bits of a preamble or a PHY header of the PPDU is populated with the priority access indication.

In some implementations, the transmission includes a priority service duration.

In some implementations, the first set of EDCA parameters are associated with a priority access class (AC_PRI) that is different from other access classes for the one or more other STAs.

In some implementations, the AC_PRI has comparatively more aggressive EDCA parameters when compared to a voice access class (AC_VO), a video access class (AC_VI), a best effort access class (AC_BE), and a background access class (AC_BK) used by the one or more other STAs.

In some implementations, the method may include receiving a beacon message from an AP. The beacon message may indicate that the AP supports the priority access service. The method may include outputting, via the wireless communication interface, the transmission in response to a determination that the AP supports the priority access service.

In some implementations, the method may include transmitting a priority service activation notification to a second AP that managed an OBSS to cause the second AP to adjust EDCA parameters for non-priority STAs associated with the second AP.

In some implementations, the priority service activation notification may be included in a beacon frame or other management frame broadcast by the first AP.

Another innovative aspect of the subject matter described in this disclosure can be implemented as a method performed by a first STA of a WLAN. The method may include determining that at least a second STA is configured to utilize a priority access service for contention-based access of a wireless channel. The method may include determining that the first STA is not configured to utilize the priority access service for the contention-based access of the wireless channel. The method may include modifying one or more settings used by the first STA for the contention-based access of the wireless channel. Modifying the one or more settings may cause the second STA to have priority over the first STA.

In some implementations, determining that the at least second STA is configured to utilize the priority access service includes detecting a transmission from the second STA that includes a priority access indication.

In some implementations, the transmission is a PPDU.

In some implementations, one or more bits of a preamble or a PHY header of the PPDU is populated with the priority access indication.

In some implementations, the transmission includes a priority service duration. The method may include reverting the one or more settings after the priority service duration.

In some implementations, determining that the at least second STA is configured to utilize the priority access service includes receiving a priority service enablement indicator from an access point.

In some implementations, receiving the priority service enablement indicator includes receiving a management frame that includes the priority service enablement indicator.

In some implementations, the management frame is a beacon frame. The priority service enablement indicator may be included in an operation element of the beacon frame.

In some implementations, modifying the one or more settings includes using a different access class for the contention-based access of the wireless channel.

In some implementations, modifying the one or more settings includes using a reduced TXOP duration when the first STA wins the contention-based access of the wireless channel.

In some implementations, the reduced TXOP duration is specified by a standard technical specification.

In some implementations, modifying the one or more settings includes adjusting one or more EDCA parameters used by the first STA for the contention-based access of the wireless channel.

In some implementations, adjusting the one or more EDCA parameters includes changing an AIFSN setting, a CWmin setting, a CWmax setting, or any combination thereof.

In some implementations, adjusting the one or more EDCA parameters includes applying an offset value to an AIFSN setting, a CWmin setting, or a CWmax setting.

In some implementations, the offset value is specified in a standard technical specification.

In some implementations, the method may include receiving the offset value in a management message from an access point.

In some implementations, adjusting the one or more EDCA parameters includes applying a first offset value to one or more EDCA parameters if the first STA is using a first access class and applying a second offset value to the one or more EDCA parameters if the first STA is using a second access class.

In some implementations, modifying the one or more settings includes using a modified algorithm for determining an initial backoff wait time for the contention-based access of the wireless channel.

In some implementations, the modified algorithm ignores a CWmin setting for determining the initial backoff wait time.

In some implementations, the modified algorithm is configured to determine the initial backoff wait time within a range from zero to one less than a CWmax setting.

In some implementations, the method may include outputting, for transmission via a wireless communication interface, a priority detection indicator to an AP to indicate that the first STA has determined that at least the second STA is configured to utilize a priority access service. The method may include causing the AP to transmit a priority service enablement indicator to a first BSS managed by the AP.

In some implementations, the method may include causing the AP to modify one or more settings of the first BSS. The one or more settings may be modified to favor the contention-based access of the wireless channel by the second STA over one or more other STAs of the first BSS that are not configured to utilize the priority access service.

Another innovative aspect of the subject matter described in this disclosure can be implemented as an apparatus. The apparatus may include a processor configured to perform any one of the above-mentioned methods.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A first wireless device, comprising:
at least one processor configured to:
manage a first basic service set (BSS) on a wireless channel, and
enable a priority access service of the first BSS for at least a second wireless device, the priority access service associated with prioritizing traffic to or from the second wireless device; and
at least one modem configured to modify one or more settings to favor the second wireless device, for contention-based access of the wireless channel, over one or more other wireless devices of the first BSS that are not using the priority access service, wherein the one or more settings comprise a first set of enhanced distributed channel access (EDCA) parameters associated with the priority access service.

2. The first wireless device of claim 1, wherein the at least one modem is further configured to:
obtain a priority service request frame from the second wireless device; and
output a priority service response frame to the second wireless device to confirm that the second wireless device is authorized to use the priority access service.

3. The first wireless device of claim 1, wherein:
the at least one modem is further configured to obtain a message that includes a priority access enablement indicator; and
the at least one processor enables the priority access service for at least the second wireless device based at least in part on the priority access enablement indicator.

4. The first wireless device of claim 1, wherein the at least one modem is further configured to:
detect a transmission from the second wireless device that includes a priority access indication populated in one or more bits of a preamble or a physical layer (PHY) header of the transmission, wherein the one or more settings are modified in response to detecting the transmission that includes the priority access indication.

5. The first wireless device of claim 1, wherein the at least one modem is further configured to output a priority service enablement indicator in a management frame.

6. The first wireless device of claim 1, wherein the at least one processor is further configured to enable a priority access class for the second wireless device, the priority access class having a higher priority compared to other access classes used by the one or more other wireless devices.

7. The first wireless device of claim 6, wherein the priority access class is associated with the first set of EDCA parameters that is different from the other access classes used by the one or more other wireless devices.

8. The first wireless device of claim 6, wherein the at least one modem is further configured to output one or more messages to cause the one or more other wireless devices to use a different access class of the other access classes for prioritized access of the wireless channel.

9. The first wireless device of claim 6, wherein the at least one processor is further configured to cause the one or more other wireless devices to use an access class of the other access classes having a lower priority for prioritized access of the wireless channel compared to the priority access class.

10. The first wireless device of claim 1, wherein the at least one processor is further configured to cause the one or more other wireless devices to use a reduced transmission opportunity (TXOP) duration if the one or more other wireless devices win prioritized access of the wireless channel.

11. The first wireless device of claim 1, wherein the at least one processor is further configured to cause the one or more other wireless devices to adjust one or more EDCA parameters selected from a group consisting of:
an arbitration inter-frame space number (AIFSN) setting;
a minimum contention window size (CWmin) setting; and
a maximum contention window size (CWmax) setting.

12. The first wireless device of claim 11, wherein causing the one or more other wireless devices to adjust the one or more EDCA parameters includes causing the one or more other wireless devices to apply an offset value to the AIFSN setting, the CWmin setting, or the CWmax setting.

13. The first wireless device of claim 1, wherein the at least one processor is further configured to:
verify that the second wireless device is authorized to use the priority access service; and
cause the at least one modem to modify the one or more settings if the second wireless device is authorized to use the priority access service.

14. A method for wireless communication at a first wireless device, comprising:
managing a first basic service set (BSS) on a wireless channel;
enabling a priority access service of the first BSS for at least a second wireless device, the priority access service being associated with prioritizing traffic to or from the second wireless device; and
modifying one or more settings to favor the second wireless device, for contention-based access of the wireless channel, over one or more other wireless devices of the first BSS that are not using the priority access service, wherein the one or more settings comprise a first set of enhanced distributed channel access (EDCA) parameters associated with the priority access service.

15. The method of claim 14, further comprising:
obtaining a priority service request frame from the second wireless device; and
outputting a priority service response frame for transmission to the second wireless device to confirm that the second wireless device is authorized to use the priority access service.

16. The method of claim 14, further comprising:
obtaining a message that includes a priority access enablement indicator, wherein the priority access service for at least the second wireless device is enabled based at least in part on the priority access enablement indicator.

17. The method of claim 14, further comprising:
detecting a transmission from the second wireless device that includes a priority access indication populated in one or more bits of a preamble or a physical layer (PHY) header of the transmission, wherein the one or more settings are modified in response to detecting the transmission that includes the priority access indication.

18. The method of claim 14, wherein modifying the one or more settings includes outputting a priority service enablement indicator for transmission in a management frame.

19. The method of claim 14, wherein modifying the one or more settings includes enabling a priority access class for the second wireless device, the priority access class having a higher priority compared to other access classes used by the one or more other wireless devices.

20. A first wireless device, comprising:
means for managing a first basic service set (BSS) on a wireless channel;
means for enabling a priority access service of the first BSS for at least a second wireless device, the priority access service being associated with prioritizing traffic to or from the second wireless device; and
means for modifying one or more settings to favor the second wireless device, for contention-based access of the wireless channel, over one or more other wireless devices of the first BSS that are not using the priority access service, wherein the one or more settings comprise a first set of enhanced distributed channel access (EDCA) parameters associated with the priority access service.

* * * * *